(12) United States Patent
Mukai et al.

(10) Patent No.: US 8,195,201 B2
(45) Date of Patent: Jun. 5, 2012

(54) RADIO POSITIONING SYSTEM AND COORDINATE CONFIGURING METHOD

(75) Inventors: Hirohito Mukai, Kanagawa (JP); Takashi Fukagawa, Kanagawa (JP); Yoichi Nakagawa, Tokyo (JP); Toshiki Kanehara, Tokyo (JP)

(73) Assignee: Panasonic Corporation, Osaka (JP)

( * ) Notice: Subject to any disclaimer, the term of this patent is extended or adjusted under 35 U.S.C. 154(b) by 232 days.

(21) Appl. No.: 12/620,975

(22) Filed: Nov. 18, 2009

(65) Prior Publication Data

US 2010/0167758 A1    Jul. 1, 2010

(30) Foreign Application Priority Data

Nov. 19, 2008   (JP) ................................ P2008-295510

(51) Int. Cl.
*H04W 24/00* (2009.01)
(52) U.S. Cl. .................................. 455/456.5; 455/456.2
(58) Field of Classification Search .............. 455/404.2, 455/414.1, 414.2, 440, 456.1, 456.5, 457; 342/385, 450–453, 463–465; 701/200, 207, 701/213–215
See application file for complete search history.

(56) References Cited

U.S. PATENT DOCUMENTS

| | | | | |
|---|---|---|---|---|
| 6,421,328 B1 * | 7/2002 | Larribeau et al. | ............ | 370/329 |
| 7,161,952 B1 * | 1/2007 | Herrmann | ................... | 370/462 |
| 2004/0157621 A1 * | 8/2004 | Yamasaki et al. | .......... | 455/456.1 |
| 2009/0005061 A1 * | 1/2009 | Ward et al. | ................. | 455/456.1 |
| 2009/0047976 A1 * | 2/2009 | Fujii et al. | .................. | 455/456.1 |

FOREIGN PATENT DOCUMENTS

JP    2004-242122 A    8/2004

* cited by examiner

*Primary Examiner* — Kamran Afshar
*Assistant Examiner* — Kenneth Corbin
(74) *Attorney, Agent, or Firm* — Pearne & Gordon LLP

(57) ABSTRACT

A radio positioning system includes a plurality of base stations and a radio terminal. Each of the base stations includes a reference signal generating portion which generates a reference signal for positioning, a transmission portion which transmits the reference signal, a reception portion which receives a signal from its outside, a positioning portion which calculates a position relative to the radio terminal or base station as a signal sender based on the received signal, and a reference signal return portion which receives a reference signal transmitted from another base station and returns the reference signal to the another base station. The radio terminal includes a terminal reception portion which receives the reference signal, and a terminal transmission portion which returns the received reference signal. A reference signal transmitted by a first base station of the base stations is received and returned by the reference signal return portion in a second base station, the returned reference signal is received by the reception portion in the first base station, and the positioning portion in the first base station measures a position relative to the second base station based on the received reference signal.

16 Claims, 26 Drawing Sheets

FIG. 8

| BASE STATION ID | RELATIVE STATION ID | POSITIONING RESULT FOR RELATIVE STATION | MASTER FLAG |
|---|---|---|---|
| 1 | - | - | 1 |
| 2 | 1 | x: -10  y: -10 | 0 |
| 3 | 1 | x: -8  y: 10 | 0 |
| 4 | 2 | x: -10  y: 0 | 0 |
| 5 | 4 | x: 2  y: 12 | 0 |
| 6 | 5 | x: 2  y: 12 | 0 |
| 7 | 4 | x: -10  y: 8 | 0 |

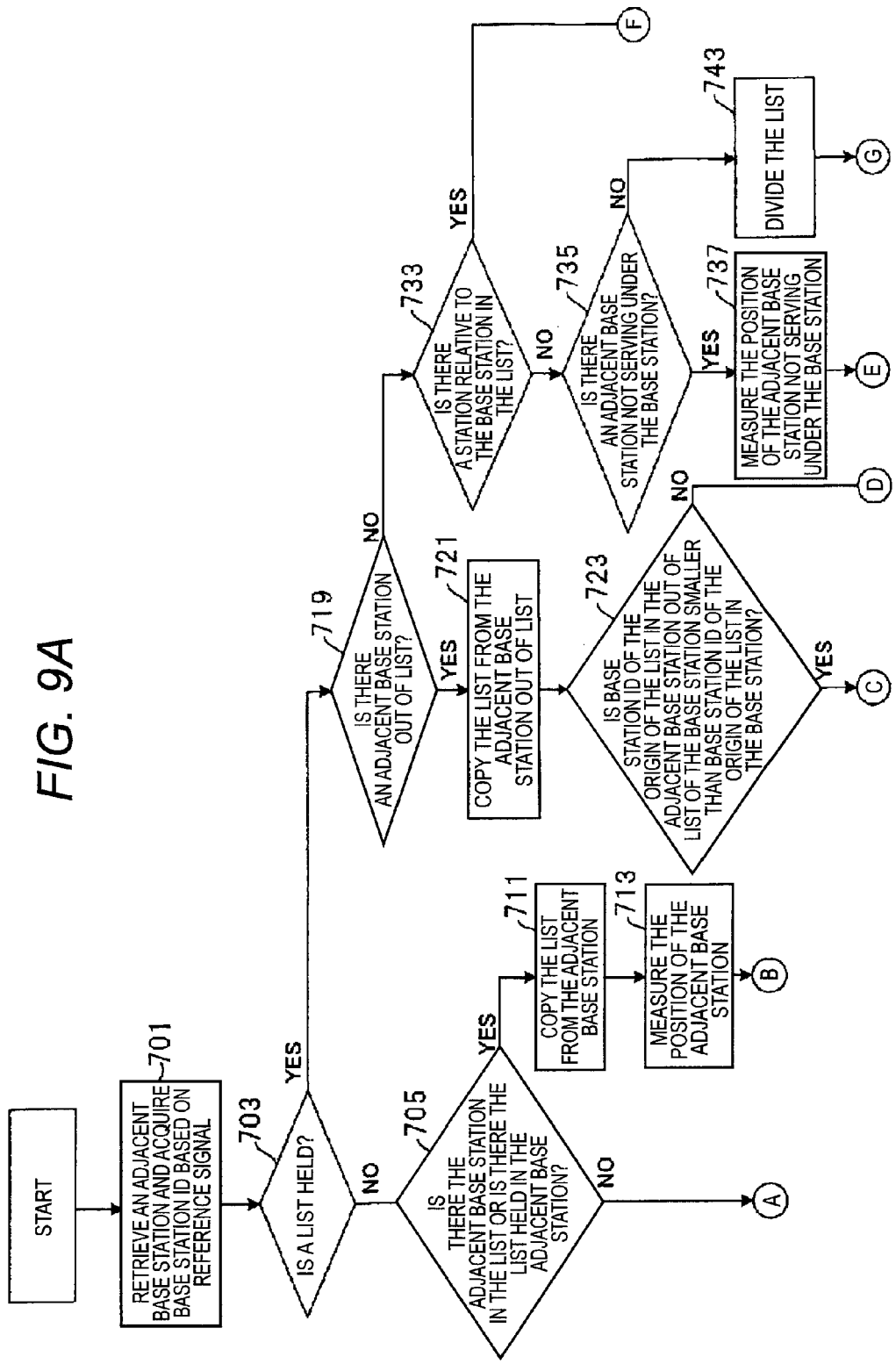

| BASE STATION ID | RELATIVE STATION ID | POSITIONING RESULT FOR RELATIVE STATION | MASTER FLAG |
|---|---|---|---|
| 1 | - | - | 1 |
| 2 | 1 | x: -10  y: -10 | 0 |
| 3 | 1 | x: -8  y: 10 | 0 |
| 4 | 2 | x: -10  y: 0 | 0 |
| 5 | 4 | x: 2  y: 12 | 0 |
| 6 | 5 | x: 2  y: 12 | 0 |
| 7 | 4 | x: -10  y: 8 | 0 |

| BASE STATION ID | RELATIVE STATION ID | POSITIONING RESULT FOR RELATIVE STATION | MASTER FLAG |
|---|---|---|---|
| 1 | - | - | 1 |
| 2 | 1 | x: -10  y: -10 | 0 |
| 3 | 1 | x: -8  y: 10 | 0 |
| 4 | 2 | x: -10  y: 0 | 0 |
| 5 | 4 | x: 2  y: 12 | 0 |
| 6 | 5 | x: 2  y: 12 | 0 |
| 7 | 4 | x: -10  y: 8 | 0 |
| 8 | 5 | x: -8  y: 10 | 0 |

FIG. 13A

| BASE STATION ID | RELATIVE STATION ID | POSITIONING RESULT FOR RELATIVE STATION | MASTER FLAG |
|---|---|---|---|
| 1 | – | – | 1 |
| 3 | 1 | x: –8  y: 10 | 0 |

FIG. 13B

| BASE STATION ID | RELATIVE STATION ID | POSITIONING RESULT FOR RELATIVE STATION | MASTER FLAG |
|---|---|---|---|
| 4 | – | – | 1 |
| 5 | 4 | x: 2  y: 12 | 0 |
| 6 | 5 | x: 2  y: 12 | 0 |
| 7 | 4 | x: –10  y: 8 | 0 |
| 8 | 5 | x: –8  y: 10 | 0 |

FIG. 13C

| BASE STATION ID | RELATIVE STATION ID | POSITIONING RESULT FOR RELATIVE STATION | MASTER FLAG |
|---|---|---|---|
| 1 | – | – | 1 |
| 3 | 1 | x: –8  y: 10 | 0 |
| 4 | 5 | x: –2  y: –12 | 0 |
| 5 | 6 | x: –2  y: –12 | 0 |
| 6 | 9 | x: –8  y: –2 | 0 |
| 7 | 4 | x: –10  y: 8 | 0 |
| 8 | 5 | x: –8  y: 10 | 0 |
| 9 | 3 | x: –2  y: 10 | 0 |

ADD NEWLY

FIG. 15A

| BASE STATION ID | RELATIVE STATION ID | POSITIONING RESULT FOR RELATIVE STATION | MASTER FLAG |
|---|---|---|---|
| 1 | – | – | 1 |
| 2 | 1 | x: –10  y: –10 | 0 |
| 3 | 1 | x: –8  y: 10 | 0 |
| 4 | 2 | x: –10  y: 0 | 0 |
| ~~5~~ | ~~4~~ | ~~x: 2  y: 12~~ | ~~0~~ |
| 6 | 5 | x: 2  y: 12 | 0 |
| 7 | 4 | x: –10  y: 8 | 0 |
| 8 | 5 | x: –8  y: 10 | 0 |

← DELETE DATA OF BASE STATION ID5 FROM THE LIST

FIG. 15B

| BASE STATION ID | RELATIVE STATION ID | POSITIONING RESULT FOR RELATIVE STATION | MASTER FLAG |
|---|---|---|---|
| 1 | – | – | 1 |
| 2 | 1 | x: –10  y: –10 | 0 |
| 3 | 1 | x: –8  y: 10 | 0 |
| 4 | 2 | x: –10  y: 0 | 0 |
| 6 | 8 | x: 10  y: 2 | 0 |
| 7 | 4 | x: –10  y: 8 | 0 |
| 8 | 7 | x: 2  y: 12 | 0 |

FIG. 17A

| BASE STATION ID | RELATIVE STATION ID | POSITIONING RESULT FOR RELATIVE STATION | MASTER FLAG |
|---|---|---|---|
| 1 | - | - | 1 |
| ~~2~~ | ~~1~~ | ~~x: 10 y: 10~~ | ~~0~~ |
| 3 | 1 | x: -8 y: 10 | 0 |
| 4 | 2 | x: -10 y: 0 | 0 |
| 5 | 4 | x: 2 y: 12 | 0 |
| 6 | 5 | x: 2 y: 12 | 0 |
| 7 | 4 | x: -10 y: 8 | 0 |
| 8 | 5 | x: -8 y: 10 | 0 |

DELETE DATA OF BASE STATION ID2 FROM THE LIST

FIG. 17B

| BASE STATION ID | RELATIVE STATION ID | POSITIONING RESULT FOR RELATIVE STATION | MASTER FLAG |
|---|---|---|---|
| 1 | - | - | 1 |
| 3 | 1 | x: -8 y: 10 | 0 |

FIG. 17C

| BASE STATION ID | RELATIVE STATION ID | POSITIONING RESULT FOR RELATIVE STATION | MASTER FLAG |
|---|---|---|---|
| 4 | - | - | 1 |
| 5 | 4 | x: 2 y: 12 | 0 |
| 6 | 5 | x: 2 y: 12 | 0 |
| 7 | 4 | x: -10 y: 8 | 0 |
| 8 | 5 | x: -8 y: 10 | 0 |

ORDINARY TRANSMISSION FORMAT
(CODE SEQUENCE M)

READER POSITIONING FORMAT
(CODE SEQUENCE N)

RADIO POSITIONING SYSTEM AND COORDINATE CONFIGURING METHOD

BACKGROUND

The present invention relates to a radio positioning system and a coordinate configuring method, and particularly to a radio positioning system and a coordinate configuring method for measuring a position of a radio terminal by using ultra wide band radio technology.

A radio positioning system disclosed in Patent Document 1 uses three or four radio base stations to detect a position of a radio terminal by using time differences of arrival between signals received by the radio terminal.

FIG. 26 is an overall view of a positioning system for detecting a position of a radio terminal as disclosed in Patent Document 1. As shown in FIG. 26, the positioning system 1801 includes radio base stations 1811, 1812 and 1813, and a calculation server 1814. The radio base stations 1811, 1812 and 1813 and the calculation server 1814 are connected to one another through a wire network 1815. The positioning system 1801 uses time differences of signal arrival between measurement signals 1816, 1817 and 1818 transmitted/received between a radio terminal 1810 and the respective radio base stations to measure the position coordinates of the radio terminal 1810. To obtain absolute time of signal arrival of each of the measurement signals 1816, 1817 and 1818, the clock of the radio terminal 1810 needs to be synchronized with the clock of each radio base station.

In the positioning system using general radio communication, the radio terminal is however asynchronous with each radio base station. For this reason, the positioning system using general radio communication cannot perform positioning using absolute time of arrival (TOA). Time differences of arrival (TDOA) of measurement signals from the radio terminal to the respective radio base stations can be however obtained when the clocks of the radio base stations are synchronized. Accordingly, positioning using relative time of arrival (time differences of arrival (TDOA)) can be performed. The positioning system 1801 shown in FIG. 26 uses the latter method to obtain time differences of arrival to thereby measure the position coordinates of the radio terminal 1810.

[Patent Document 1] JP-A-2004-242122 (page 6, page 12, FIG. 1)

In the radio positioning system disclosed in Patent Document 1, it is however necessary to synchronize the clocks of the base stations 1811, 1812 and 1813 because the position of the radio terminal is measured based on time differences of arrival to the base stations 1811, 1812 and 1813. For this reason, it is necessary to connect the base stations to one another by cable or provide a reference station separately from the base stations 1811, 1812 and 1813 for measuring the position coordinates of the radio terminal 1810 in order to synchronize the clocks of the base stations.

To measure the position of the radio terminal 1810 based on time differences of arrival to the base stations 1811, 1812 and 1813, it is necessary to hold relative position relations between the base stations as data in advance. Therefore, the positions (unified coordinates) of the respective base stations must be measured in advance and the position information must be input to the respective base stations.

SUMMARY

An object of the invention is to provide a radio positioning system and a coordinate configuring method in which a unified coordinate system indicating position relations between a plurality of base stations can be configured automatically in such a manner that each base station per se measures positions relative to other base stations (obtains relative coordinates) by using a single-point positioning technique capable of specifying a position of a radio terminal or the like based on only one signal received by one base station and results of the measurement are unified and transformed into absolute coordinates.

The invention provides a radio positioning system comprising:
  a plurality of base stations; and
  a radio terminal,
  wherein each of the base stations includes a reference signal generating portion which generates a reference signal for positioning, a transmission portion which transmits the reference signal, a reception portion which receives a signal from its outside, a positioning portion which calculates a position relative to the radio terminal or base station as a signal sender based on the received signal, and a reference signal return portion which receives a reference signal transmitted from another base station and returns the reference signal to the another base station;
  wherein the radio terminal includes a terminal reception portion which receives the reference signal, and a terminal transmission portion which returns the received reference signal; and
  wherein a reference signal transmitted by a first base station of the base stations is received and returned by the reference signal return portion in a second base station, the returned reference signal is received by the reception portion in the first base station, and the positioning portion in the first base station measures a position relative to the second base station based on the received reference signal.

Accordingly, each of the base stations can measure a position relative to another base station or a radio terminal by using the reference signal.

The radio positioning system may further includes a transmission path which connects the base stations to one another, and a unifying portion which is connected to the base stations by the transmission path. The unifying portion includes a communication portion which receives information through the transmission path, and a unified coordinate transformation portion which generates a unified coordinate system indicating position relations between the base stations based on positioning results measured by the respective base stations and transforms the position of the radio terminal into unified coordinates based on a positioning result of the radio terminal measured by at least one of the base stations.

Accordingly, the unified coordinate system indicating a position relation between the plurality of base stations can be configured automatically based on the positioning result measured between the plurality of base stations.

In the radio positioning system and the coordinate configuring method according to the invention, a unified coordinate system indicating the position relation between the base stations can be configured automatically in such a manner that each base station per se measures positions relative to other base stations (obtains relative coordinates) by using a single-point positioning technique capable of specifying a position of a radio terminal or the like based on only one signal received by one base station and the result of the measurement is unified and transformed into absolute coordinates.

BRIEF DESCRIPTION OF THE DRAWINGS

The above objects and advantages of the present invention will become more apparent by describing in detail preferred exemplary embodiments thereof with reference to the accompanying drawings, wherein:

FIG. 8 is a view showing an example of a base station list included in the base station shown in FIG. 7;

FIGS. 9A and 9B are flow charts showing a processing procedure in a control processor when environment of a base station changes;

FIG. 13A is a view showing a base station list in one of two radio positioning systems in Embodiment 2 of the invention, FIG. 13B is a view showing a base station list in the other of the two radio positioning systems in Embodiment 2 of the invention, and FIG. 13C is a view showing a base station list in a new radio positioning system formed by merging the two radio positioning systems in Embodiment 2 of the invention;

FIG. 15A is a view showing an example of the base station list before change of relative stations, and FIG. 15B is a view showing an example of the base station list after change of relative stations;

FIG. 17A is a view showing the base station list (before division) of the radio positioning system in Embodiment 2, and FIGS. 17B and 17C are views showing the base station lists (after division) of the radio positioning system in Embodiment 2;

DETAILED DESCRIPTION OF EXEMPLARY EMBODIMENTS

Embodiments of the invention will be described below with reference to the drawings.

Embodiment 1

Figure 1:
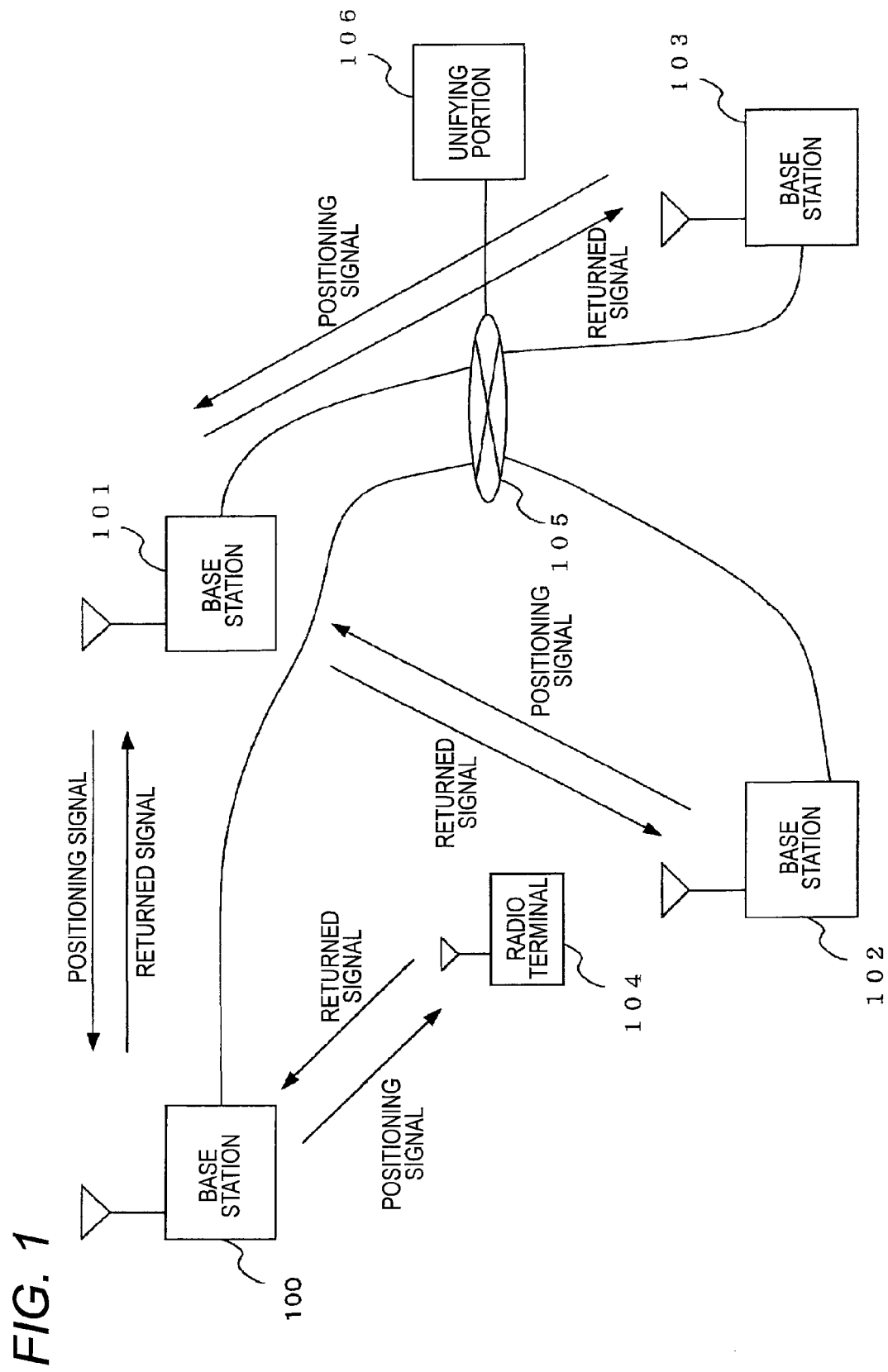
FIG. 1 is a diagram showing the overall configuration of a radio positioning system according to Embodiment 1 of the invention.

FIG. 1 is a diagram showing a radio positioning system according to the invention. In FIG. 1, the radio positioning system includes a first base station 100, a second base station 101, a third base station 102, a fourth base station 103, a radio terminal 104, a communication line 105 for communication, and a unifying portion 106. Each of the first to fourth base stations 100 to 103 can perform single-point positioning. The position of the radio terminal 104 is measured by each of the first to fourth base stations 100 to 103. The unifying portion 106 performs calculation for improving accuracy of the position of the radio terminal by using position information of the radio terminal measured by the base stations.

Single-point positioning is a method in which the position of a radio terminal is specified not based on signals received by base stations as in the system described in the background art but based on only one signal received by one base station. According to the single-point positioning, for example, the distance between a base station and a radio terminal and the direction of the radio terminal relative to the base station are measured to thereby specify the position of the radio terminal.

The first base station 100 has a function of measuring the position of the radio terminal by using a radio signal. Each of the second to fourth base stations 101, 102 and 103 has a function of measuring the position of the radio terminal in the same manner as in the first base station 100. Each of the first to fourth base stations 100, 101, 102 and 103 measures the position of the radio terminal existing in a predetermined range corresponding to a set communication distance. The set communication distance is limited to a certain range in accordance with a propagation environment condition of an area where the radio terminal exists, such as attenuation of signal power, shielding due to a wall, a partition or the like, bending of a corridor, etc. Assuming that each base station and the radio terminal use a UWB radio signal, then the measurable range of the position of the radio terminal is regarded as a range of a circle of 10-30 m whose center is a base station, based on the condition of the transmission power.

Therefore, base stations are set as shown in FIG. 1 in order to measure the position of a mobile radio terminal in a wider range. On this occasion, the distance between base stations adjacent to each other is set as a distance at which the adjacent base stations can receive signals transmitted by the adjacent base stations. For example, assuming that each base station has a position measurable area of 10-30 m whose center is the each base station, it is the worst case on a distance that the base stations are located so that the position measurable areas of the base stations are tangent to each other. In this case, it is necessary that the base stations can measure a position of the terminal in an area where the distance between the base stations is 20-60 m. In this case, an environment is assumed as an example that base stations are disposed discretely on a ceiling so that the propagation linear distance between adjacent base stations is so short that line-of-sight propagation can be made. In this environment, a distance condition can be loosed from the worst condition and the loss can become lower than the margin to be considered in link budget. However, the arrangement of the base stations is not limited to the line-of-sight environment. Particularly, base stations once installed are fixed to each other, so that relative positions of the base stations do not change. For this reason, by using signal integration for a long time compared with communication time, signal sensitivity can be improved. Accordingly, the arrangement of base stations in which base stations are disposed at 4 m above the ground and at a distance of about 20 m from each other, that is, positioning areas of 10 m radius overlap each other, is assumed as an example of typical arrangement.

Figure 2:
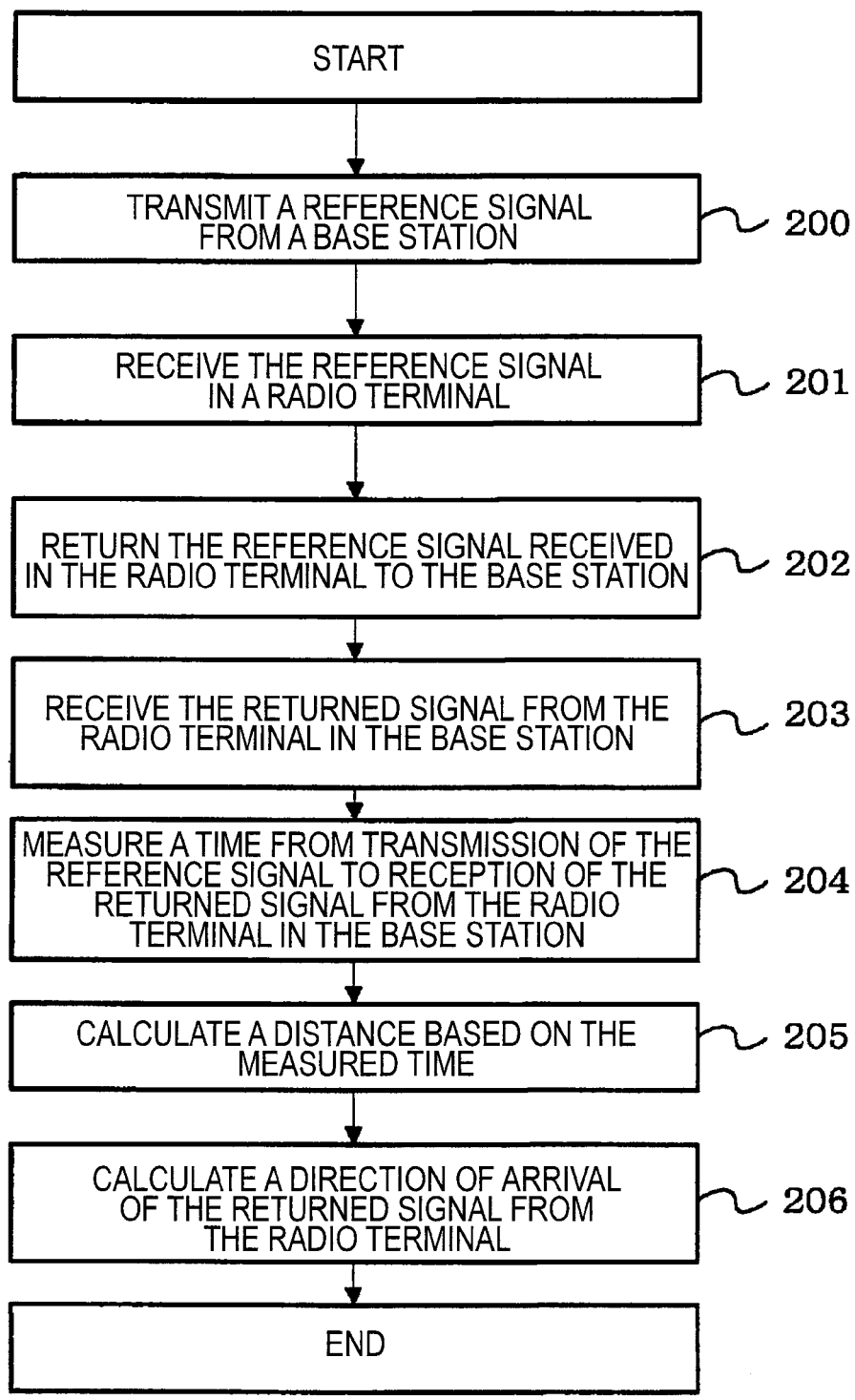
FIG. 2 is a flow chart showing a procedure of positioning in Embodiment 1 of the invention.

A method of measuring the position of the radio terminal 104 will be described with reference to FIG. 2. FIG. 2 is a flow chart showing signal exchange between the first base station 100 and the radio terminal 104 to measure the position of the radio terminal 104. To measure the position of the radio terminal, radio signals are communicated between the first base station 100 and the radio terminal 104. Although there are several positioning methods using radio signals, a method in which the base station obtains the distance and angle of a signal received from the radio terminal is used as an example of single-point positioning.

In step 200 shown in FIG. 2, the base station 100 transmits a reference signal to the radio terminal 104. For example, a UWB pulse signal short in transmission time, a highly autocorrelative signal such as an M-sequential signal, or the like, can be used as the reference signal. A passive method or a semi-passive method using a UWB pulse signal is used by way of example.

In step 201, the radio terminal 104 receives the reference signal transmitted by the first base station 100. The radio terminal 104 amplifies the signal received from the base station.

Then, in step 202, the radio terminal 104 amplifies and transmits the reference signal received from the first base station 100, to the first base station 100.

Then, in step 203, the first base station 100 receives the reply from the radio terminal 104. In this manner, the reference signal transmitted by the first base station 100 is amplified by the radio terminal 104 and then returned, so that the first base station 100 receives the returned reference signal.

Then, in step 204, the base station 100 measures an arrival time required from a timing when the reference signal is transmitted by the first base station 100 to a timing when the base station 100 receives the reference signal which is returned from the radio terminal 104.

In step 205, the distance between the base station 100 and the radio terminal 104 is calculated based on the measured arrival time. By the aforementioned steps, the distance from the base station to the radio terminal can be obtained.

In step 206, an arrival direction of arrival waves transmitted from the radio terminal 104 and received by the first base station 100 is obtained. There is used a method which uses reception antennas to calculate the arrival direction by an arrival direction estimation algorithm based on phase differences between signals received by the reception antennas respectively. For example, a MUSIC (Multiple Signal Classification) method or an ESPRIT (Estimation of Signal Parameters via Rotational Invariance Techniques) method can be used as the method of estimating the arrival direction based on phases of arrival waves received by the antennas respectively. A method of synthesizing reception signals simply to sweep beams to thereby obtain a maximum reception direction is also used generally. By the aforementioned steps, the distance from the first base station 100 to the radio terminal 104 and the arrival direction of the signal transmitted from the radio terminal 104 and received by the first base station 100 are obtained so that the position of the radio terminal 104 can be measured.

Detection of the positions of base stations in a radio positioning system will be described with reference to FIG. 1.

In FIG. 1, the first to fourth base stations 100, 101, 102 and 103 are connected to one another by a wire cable 105 such as an Ethernet (registered trademark) cable and further connected to a unifying portion 106. Position information of a radio terminal 104 measured by the first base station 100 is transmitted to the unifying portion 106 through the wire cable 105. The unifying portion 106 performs a process of collecting position information of the radio terminal measured by base stations and generating one unified coordinate system. The unified coordinates are provided as absolute coordinates.

The unifying portion 106 can perform the process of generating a unified coordinate system on the assumption that positions of set base stations have been detected. The method of acquiring coordinates of the base stations and generating a unified coordinate system will be described below. When there are base stations, it is first necessary to determine coordinate axes (origin). In the example shown in FIG. 1, a coordinate system with the position of the first base station 100 as the origin is generated. By setting one base station as a reference point, a coordinate system indicating position relations between base stations can be defined easily compared with the background art in which it was necessary to obtain absolute coordinates of base stations in advance.

Incidentally, the base station set as the origin is not limited to the base station 100 and another base station may be set as the origin. Accordingly, because any one base station can be set as the origin, the positioning range can be changed easily without change of devices of the base station per se when the base stations are configured.

When the position of the first base station 100 is set as the origin, data measured in the second base station 101 are obtained by offsetting the position coordinates of the second base station 101 with the coordinates of the first base station 100 as the origin. Accordingly, when the coordinates of the second base station 101 from the origin are obtained, and results measured in the base station 101 are corrected by using the coordinates of the base station 101, the position of the radio terminal 104 measured in the second base station 101 can be transformed into unified coordinates on the basis of the position of the first base station 100.

The base station 101 measures the position of the base station 100 to obtain coordinates relative to the origin. The positioning method is the same as in the flow chart shown in FIG. 2. Each of the first to fourth base stations 100, 101, 102 and 103 has the same configuration as the radio terminal 104 so that each base station can measure the position of an adjacent base station. A terminal having the same configuration as the radio terminal 104 may be included in each of the first to fourth base stations.

A procedure of positioning will be described below. The second base station 101 transmits a reference signal for positioning. Upon reception of the reference signal from the second base station 101, the first base station 100 amplifies the received signal and transmits the amplified signal as a returned signal. Upon reception of the amplified and returned reference signal from the first base station 100, the second base station 101 obtains a distance of arrival waves and an angle of arrival from the received signal to thereby specify the position of the first base station 100.

Similarly, the third base station 102 transmits a reference signal to measure the position of the adjacent second base station 101. Upon reception of the reference signal from the third base station 102, the second base station 101 amplifies the reference signal and transmits the amplified reference signal as a returned signal. Upon reception of the amplified and returned reference signal from the second base station 101, the third base station 102 obtains a distance of arrival waves and an angle of arrival from the received signal to thereby specify the position of the second base station 101.

On this occasion, the third base station 102 is existed in a range where positioning reference signals transmitted by the first and second base stations 100 and 101 as adjacent base stations can arrive at the third base station 102. Although there are two base stations to obtain relative coordinates, relative coordinates of any of the two base stations can be obtained. For example, when the position of the first base station 100 is measured and relative coordinates are obtained based on the first base station 100, the origin and correction can be obtained. Even when the position of the second base station 101 is measured and relative coordinates are obtained based on the second base station 101, the third base station 102 can obtain the origin and correction indirectly via the second base station 101 because the first base station 100 is positioned and relative coordinates are obtained based on the first base station 100.

Although the third base station 102 obtains relative coordinates based on selected one of two adjacent base stations existing in a range where a reference signal can arrive at the third base station 102, the invention is not limited thereto. For example, the two base stations may be positioned to obtain relative coordinates based on the two base stations. In this case, two kinds of relative coordinates may be used so that they are synthesized to improve measuring accuracy. A method of calculating an average of measured results or a method of performing weighted synthesis by using reception power of waves of arrival can be used as a method of synthesizing two pieces of data.

Then, the fourth base station 103 transmits a reference signal to measure the position of the adjacent second base station 101. Upon reception of the reference signal from the fourth base station 103, the second base station 101 amplifies the reference signal and transmits the amplified reference signal as a returned signal. Upon reception of the amplified and returned reference signal from the second base station 101, the fourth base station 103 obtains a distance of waves of arrival and an angle of arrival from the received signal to thereby specify the position of the second base station 101.

Data of relative coordinates obtained by each base station's positioning adjacent base stations in this manner are transmitted to the unifying portion 106 through the wire network 105. The unifying portion 106 generates unified coordinates based on the position of one base station as the origin by using relative coordinates of adjacent base stations measured by each base station. In the example shown in FIG. 1, the first base station 100 is set as the origin. Because each base station measures the positions of adjacent base stations by this method so that a plurality of base stations can be mapped on one coordinate system, a wide-range coordinate system can be generated even when the measurable range of one base station is limited.

The unifying portion 106 performs a process of transforming the position of the radio terminal measured by each base station into coordinates on the aforementioned unified coordinate system. That is, because each base station may simply measure the position of the radio terminal existing in the range of the base station as coordinates based on the base station as the origin and transmit measured coordinate data to the unifying portion, the unified coordinates need not be held in each base station. Accordingly, even when the configuration and position of each base station are changed, unified coordinates can be reconstructed easily.

Figure 3:
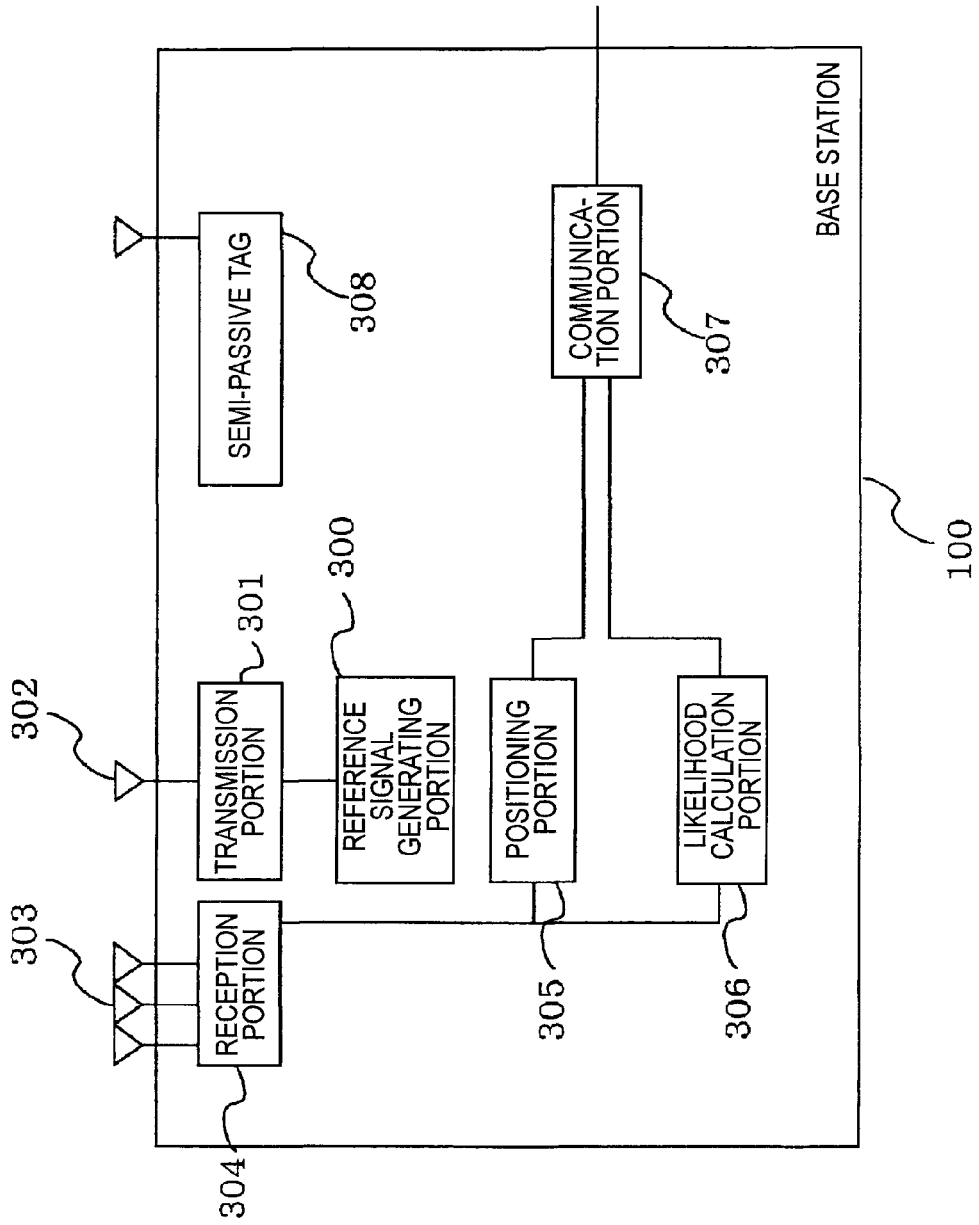
FIG. 3 is a diagram showing the configuration of a base station in Embodiment 1 of the invention.

FIG. 3 is a block diagram showing the internal configuration of the first base station 100. The first base station 100 has a reference signal generating portion 300 for generating a reference signal for positioning, a transmission portion 301 for converting the reference signal into a radio signal, a transmission antenna 302, an array antenna 303 for receiving signals from the outside, a reception portion 304 for receiving a returned signal from the radio terminal, a positioning portion 305 for calculating a distance to the radio terminal or base station as a sender of the signal and a direction of arrival based on the signal received by the reception portion 304, a likelihood calculation portion 306 for calculating likelihood of a returned signal from the base station and radio terminal, a communication portion 307 for performing data communication with another base station and the unifying portion, and a semi-passive tag portion 308 for returning and transmitting a reference signal transmitted by the other base station.

The operation of the base station will be described with reference to FIG. 3. The reference signal generating portion 300 generates a reference signal used for positioning. For example, a UWB pulse signal is used as the reference signal.

The transmission portion 301 converts a baseband signal of the reference signal generated by the reference signal generating portion, into a radio frequency signal. On this occasion, processes such as amplification, band limit, etc. are performed by the transmission portion 301. The reference signal converted into the radio frequency signal by the transmission portion 301 is transmitted to space through the transmission antenna 302. The array antenna 303 receives a returned signal from the radio terminal and base station.

The reception portion 304 converts the radio signal received through the array antenna 303, into a baseband signal. On this occasion, processes such as amplification, band limit, etc. are applied to the received signal.

The positioning portion 305 receives, as an input, the reference signal converted into the baseband signal by the reception portion. The positioning portion 305 performs a process of obtaining a distance to the radio terminal or base station as a sender of the returned signal by using the reference signal in accordance with an input of a control signal generated separately and a process of calculating a direction of arrival of the reference signal based on the reference signal received through different antenna elements included in the array antenna. The positioning portion 305 inputs the distance and direction of arrival to the communication portion 307. With respect to a method of obtaining the distance, the time from transmission of a reference signal to reception of the returned reference signal from the radio terminal and base station as described above is measured. With respect to a method of measuring the direction of arrival, the direction of arrival is calculated by an arrival direction estimation algorism using the returned signal received through the antenna elements as described above.

The likelihood calculation portion 306 receives, as an input, the reference signal converted into the baseband signal output from the reception portion 304. The likelihood calculation portion 306 calculates likelihood indicating likelihood of a positioning result obtained based on waves of arrival. A method of calculating likelihood based on reception power can be conceived.

Likelihood is a value indicating likelihood of the obtained positioning result. When attention is paid to reception power of waves of arrival, there is a high possibility that an accurate value will be obtained as a positioning result obtained by using waves of arrival high in reception power because the waves of arrival are hardly affected by noise. However, as reception power becomes lower, the influence of noise becomes so large that reliability of the positioning result is lowered. By using this characteristic, the likelihood calculation portion 306 outputs, as likelihood, the positioning result obtained as reception power of waves of arrival. Although description has been made in the case where reception power is used as likelihood, the invention is not limited thereto as long as characteristic of waves of arrival can be expressed.

The communication portion 307 transmits the positioning result output from the positioning portion 305 and the likelihood output from the likelihood calculation portion 306, to the wire network 105. Although description has been made in the case where the wire network is used for the communication portion 307 by way of example, the invention is not limited thereto. For example, a wireless network such as a wireless LAN may be used. In this case, easiness of installation of the base station is improved. Even when a base station is added or deleted, the network need not be installed or removed. Even when the position of a base station is changed, the labor for changing the network can be omitted.

The semi-passive tag 308 has the same configuration as in the radio terminal 104. Incidentally, the semi-passive tag may be called 'reference signal return portion'. Upon reception of a positioning reference signal from a base station, the semi-passive tag 308 amplifies the reference signal and transmits the amplified reference signal to the base station. The semi-passive tag 308 is used for positioning from an adjacent base station. The adjacent base station transmits a positioning reference signal to the semi-passive tag of a base station to be positioned and receives the returned reference signal from the semi-passive tag. When the distance and direction of arrival of the signal are measured, the position of the adjacent base station can be measured. That is, when a base station has the same configuration as the radio terminal 104, the position of the base station can be measured from another base station.

Figure 4:
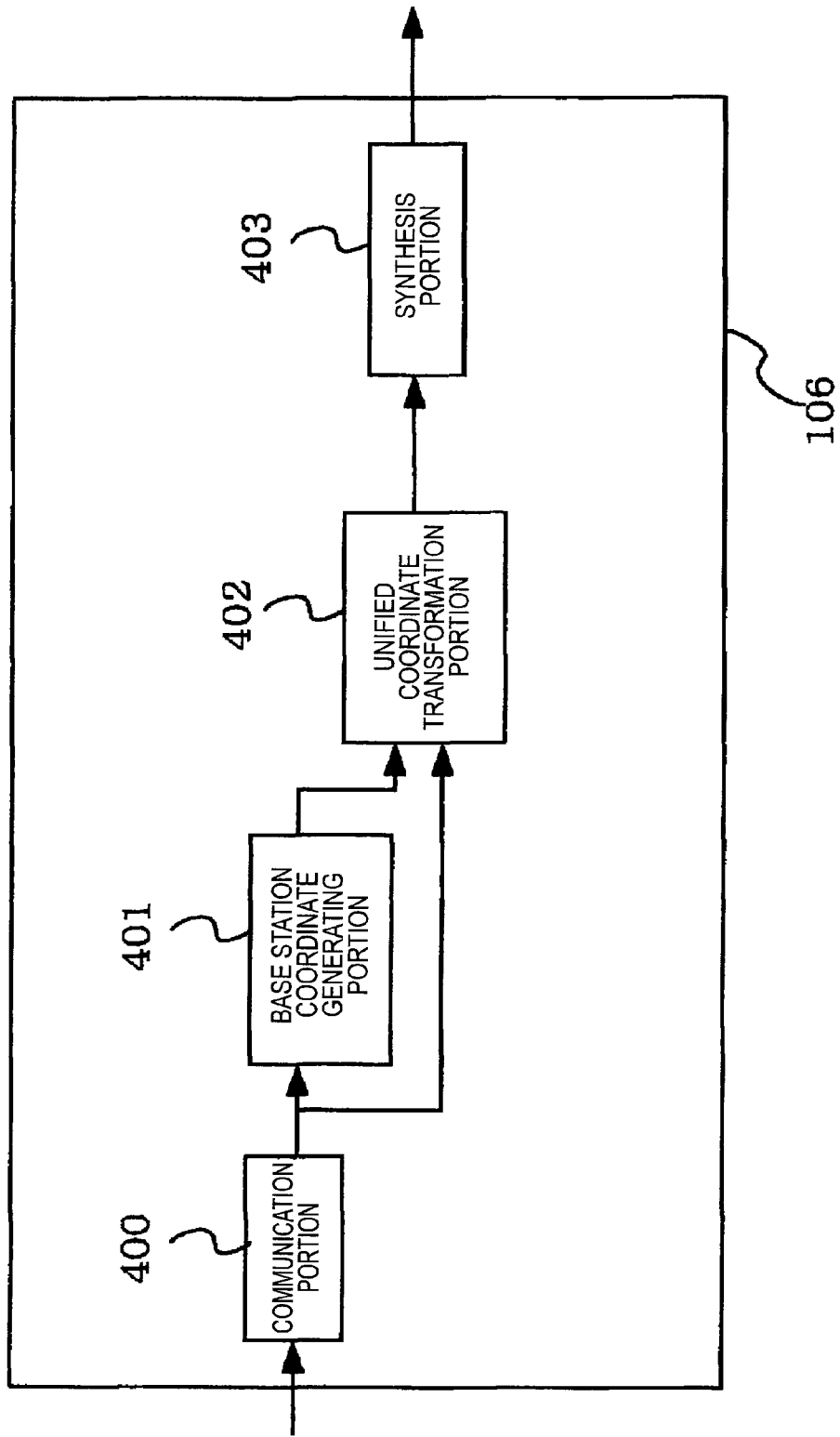
FIG. 4 is a diagram showing the configuration of a unifying portion in Embodiment 1 of the invention.

The unifying portion 106 shown in FIG. 1 will be described below with reference to FIG. 4. The unifying portion 106 performs a process of collecting data measured by a plurality of base stations, into a unified coordinate system. FIG. 4 is a block diagram showing the configuration of the unifying portion 106. The unifying portion 106 has a communication portion 400, a base station coordinate creation portion 401, a unified coordinate transformation portion 402, and a synthesizing portion 403.

The communication portion 400 is connected to the wire network 105 and exchanges data with a base station. For example, Ethernet (registered trademark), wireless LAN, etc. can be used as a communication method. The communication portion 400 receives data as positioning results from base stations or transmits data transformed into unified coordinates to the base stations, respectively. Incidentally, a positioning result obtained by each base station is transmitted to the base station measuring the positioning result after an identifier ID peculiar to the base station is added to the positioning result. Incidentally, the radio terminal 104 amplifies the received signal, adds the identifier ID peculiar to the radio terminal to the amplified signal and transmits the signal when the signal is transmitted as a returned signal.

The base station coordinate creation portion 401 extracts positioning results indicating identifier ID 'base station' from positioning results received by the communication portion 400. The base station coordinate creation portion 401 creates unified coordinates indicating the positions of other base stations based on the extracted positioning results with use of a certain base station as the origin. On this occasion, there may be a case where a plurality of positioning results correspond to one identifier ID. For example, when each base station performs code-division multiplex by spectral diffusion of a signal sent from the base station, time synchronization between base stations is not required so that the radio terminal adds its own ID to the signal transmitted from each base station and returns the signal to each base station. This shows that one base station is positioned by a plurality of base stations. When there are a plurality of positioning results corresponding to one identifier ID, an average of the positioning results can be calculated or weighted synthesis can be performed by using the likelihood output from the likelihood calculation portion 306. By performing the averaging process or the synthesizing process, a unified coordinate with higher accuracy can be created with the certain base station as the origin.

The unified coordinate transformation portion 402 receives, as inputs, the unified coordinate of each base station created by the base station coordinate creation portion 401 and the positioning result indicating the position of the radio terminal and output from the communication portion 400. The unified coordinate transformation portion 402 extracts results indicating another identifier ID than the identifier ID 'base station' from the positioning results and transforms the positioning result of the radio terminal into a point on the unified coordinate system by using the unified coordinate of the base station measuring the radio terminal.

The synthesis portion 403 synthesizes the positioning results input to the synthesis portion. Synthesis is applied to positioning results which have the same identification number (ID) of the radio terminal but are measured by different base stations. A method of calculating an average of results indicating the same ID of the radio terminal measured by a plurality of base stations or a method of applying weighted synthesis to positioning results by using the likelihood calculated by the likelihood calculation portion 306 simultaneously with positioning is used as the synthesizing method. Reception power of waves of arrival used for positioning is used as the likelihood used for weighted synthesis. By applying the averaging process or the likelihood synthesizing process to the positioning result, the accuracy of the positioning result can be improved. This can be achieved because results measured by a plurality of base stations can be associated with one another when the positions of the base stations are expressed on one coordinate system.

Figure 5:
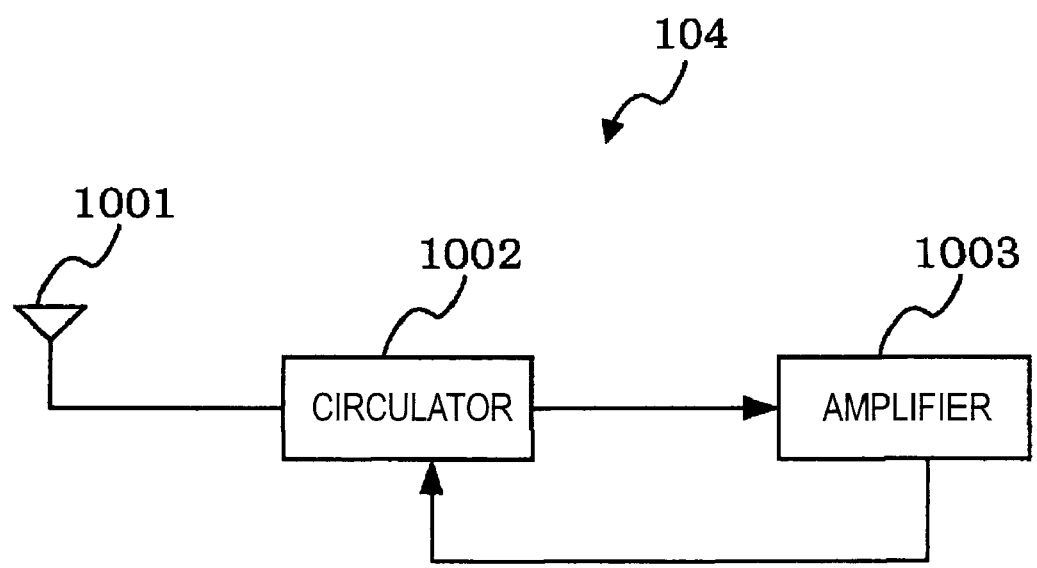
FIG. 5 is a diagram showing the configuration of a base station in Embodiment 2 of the invention.

FIG. 5 is a diagram showing the internal configuration of the radio terminal 104 shown in FIG. 1. The radio terminal 104 has an antenna 1001, a circulator 1002, and an amplifier 1003.

The antenna 1001 receives a reference signal transmitted from a base station to space. The received signal is input to the circulator 1002.

The circulator 1002 feeds a signal input through the antenna to the amplifier 1003 and feeds a signal output from the amplifier 1003 to the antenna 1001. The circulator is an electronic component having a function of one-way passing the input signal. Accordingly, the signal input through the antenna is not fed to an output of the amplifier and the output of the amplifier is not fed to an input of the amplifier.

The amplifier 1003 receives, as an input, the signal received from the base station through the antenna and passing through the circulator. The input signal is amplified and output from the amplifier 1003. The signal output from the amplifier is input to another terminal than the antenna input of the circulator and fed to the antenna 1001.

The antenna 1001 transmits the signal sent from the circulator to space.

In this manner, the radio terminal 104 amplifies and transmits the input signal. As a result, the reference signal transmitted from the base station can be received and transmitted to the base station.

Although the radio terminal 104 shown in FIG. 5 is configured so that the received signal is amplified and transmitted, the invention is not limited thereto. The radio terminal 104 may be configured so that the received signal is detected, converted into a baseband signal, up-converted into a radio signal, amplified and returned. In this case, the radio terminal 104 has a reception portion for detecting and down-converting the received signal, and a transmission portion for up-converting the signal into a radio signal and amplifying the radio signal.

As described above, when a radio tag having the same configuration as in the radio terminal to be positioned is mounted in a single-point positioning base station, unified coordinates of base stations can be constructed automatically without presetting by using positioning results of the base stations. When a new base station is added or an existing base station is deleted in the coordinate system once constructed, unified coordinates can be reconstructed automatically. Accordingly, easiness of installation of devices can be improved. When the averaging process or the weighted synthesizing process is further applied to results measured by base stations by using the created unified coordinates, accuracy of positioning results can be improved.

Incidentally, a result of positioning the radio terminal as well as a result of positioning the base station may be used for creating unified coordinates. The radio terminal is disposed in a position where positioning can be performed from a plurality of base stations and the radio terminal is positioned from the plurality of base stations. Unified coordinates are created or corrected so that positioning results of the radio terminal measured in the respective base stations coincide with one another. Accordingly, even when the distance between adjacent base stations is a distance in which electric waves cannot reach, the radio terminal can be disposed at a distance in which electric waves can reach both adjacent base stations, so that unified coordinates can be created by using the positioning result of the radio terminal. Alternatively, when unified coordinates are corrected by using the results of the radio terminal measured from a plurality of base stations, accuracy of creation of the unified coordinates can be improved.

Although a method using one radio terminal for creating unified coordinates has been described, the invention is not limited thereto and a plurality of radio terminals may be used. When unified coordinates are created by using positioning results of the base stations, accuracy of creation of the unified coordinates can be improved.

By the configuration described in this embodiment, the base station according to the invention can be positioned without discrimination between a base station and a radio terminal. Accordingly, the base station can transmit information to the unifying portion without consciousness of whether the positioning result is of a base station or of a radio station. However, as for transmission contents, an identifier ID indicating a positioning target is added to each positioning result.

The unifying portion determines whether the positioning result is of a base station or of a radio terminal based on the identifier ID added to the positioning result and constructs unified coordinates by using the positioning result of the base station. Even when a base station is added or deleted, it is not necessary to change setting because the base station can be positioned without consciousness of whether the positioning result is of a base station or of a radio terminal. Because unified coordinates can be created by the unifying portion when a base station is added or deleted, there is an effect of improving easiness of installation of the base stations.

Embodiment 2

Embodiment 2 of the invention will be described below with reference to FIGS. 6 to 17. Parts like those in Embodiment 1 are referred to by like numerals for the sake of omission of duplicate description. The functions and operations of different parts will be described.

In the radio positioning system according to Embodiment 2, a method in which base stations create unified coordinates autonomous-distributedly will be described. In unified coordinates once constructed, when there is a change in base station environment such as addition of a new base station, deletion of an existing base station, etc., unified coordinates can be reconstructed autonomous-distributedly.

Figure 6:
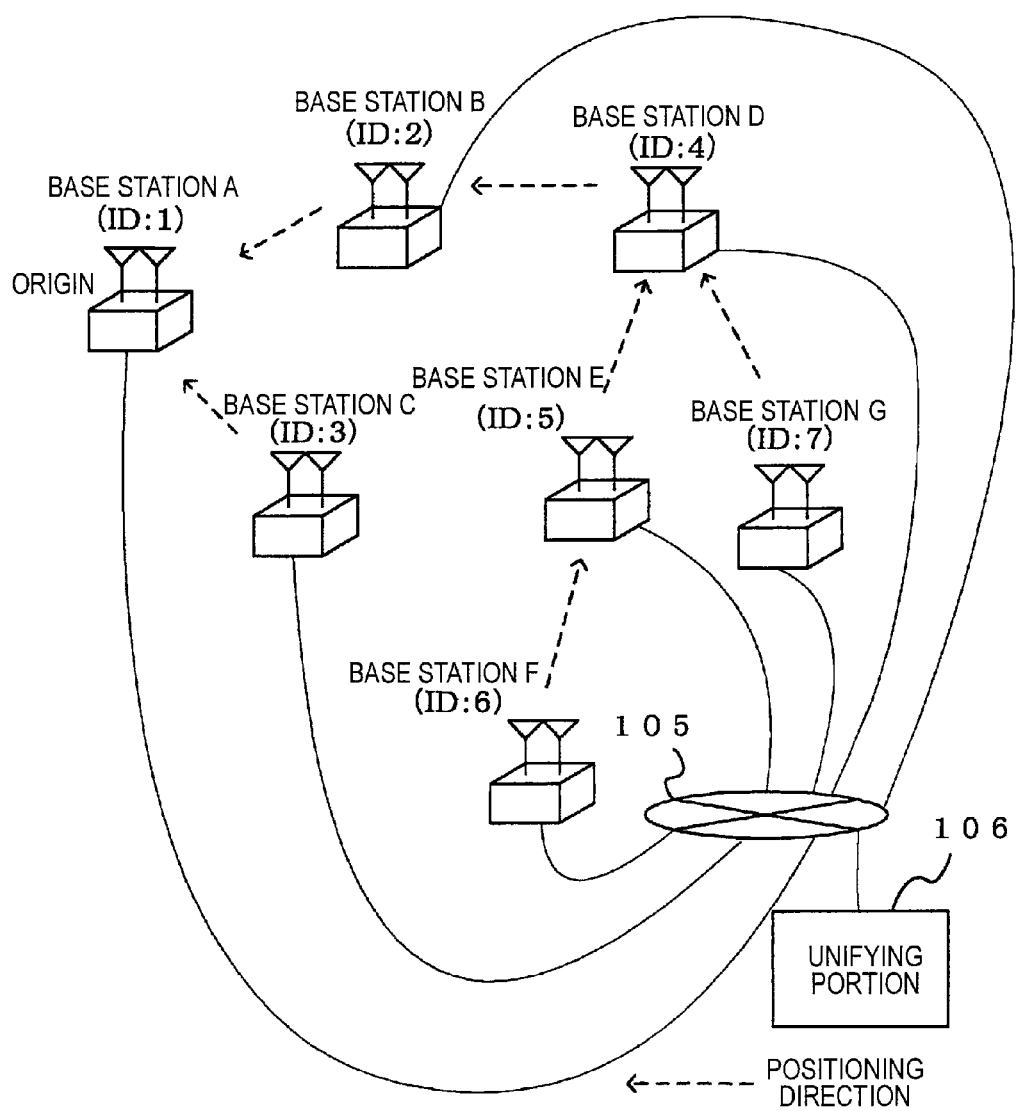
FIG. 6 is a diagram showing the configuration of a base station list in Embodiment 2 of the invention.

FIG. 6 is a diagram showing an example of a radio positioning system according to Embodiment 2 of the invention. The radio positioning system according to Embodiment 2 shown in FIG. 6 has base stations A to G capable of performing single-point positioning, a radio terminal 104 whose position is measured, a communication line 105 for performing communication, and a unifying portion 106 for performing calculation to improve accuracy of the position of the radio terminal by using position information of the radio terminal measured by the base stations. A base station designated by the head of each arrow (broken line) shown in FIG. 6 is a base station (relative station) subjected to positioning.

Single-point positioning is a method of specifying the position of the radio terminal not by using signals received by a plurality of base stations but by using only one signal received by one base station. By single-point positioning, for example, a distance between a base station and the radio terminal and a direction of the radio terminal relative to the base station are measured to specify the position of the radio terminal.

Each of the base stations A to G has a function of measuring the position of the radio terminal by using a radio signal in the same manner as the base station in Embodiment 1. Each of the base stations A to G measures the position of the radio terminal existing in a predetermined range corresponding to a set communication distance. The set communication distance is limited to a certain range in accordance with a propagation environment condition of an area where the radio terminal exists, such as attenuation of signal power, shielding due to a wall, a partition or the like, bending of a corridor, etc.

Therefore, to measure the position of the mobile radio terminal in a wider range, base stations A to G are disposed as shown in FIG. 6. On this occasion, the distance between base stations adjacent to each other is set as a distance at which the adjacent base stations can receive signals transmitted by the adjacent base stations. In this case, an environment is assumed as an example where base stations are disposed discretely on a ceiling so that the propagation linear distance between adjacent base stations is so short that line-of-sight propagation can be made. However, the environment is not always limited to the line-of-sight environment.

Because the method of measuring the position of each base station is the same as in Embodiment 1, description thereof will be omitted. Similarly, because the method of measuring the position of the radio terminal 104 in Embodiment 2 is the same as the procedure (FIG. 2) in Embodiment 1, description thereof will be omitted.

Figure 7:
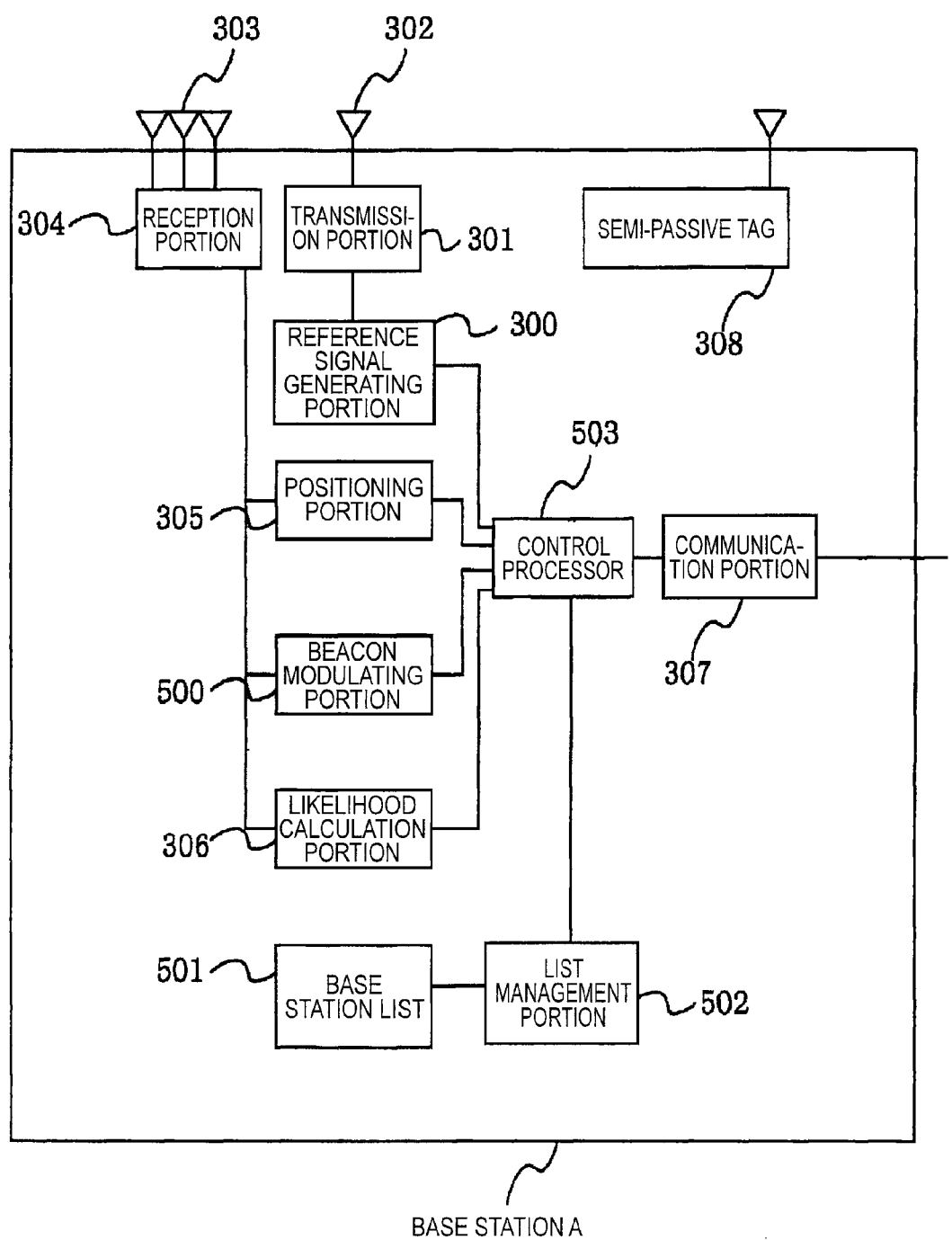
FIG. 7 is a diagram showing an example of arrangement of base stations in the overall configuration of a radio positioning system according to Embodiment 2 of the invention.

The internal configuration of the base station in Embodiment 2 will be described below with reference to FIG. 7. FIG. 7 is a block diagram showing the internal configuration of the base station A in Embodiment 2.

The point of difference of the internal configuration of the base station A in Embodiment 2 from the internal configuration of the base station 100 in Embodiment 1 shown in FIG. 3 lies in that the base station A has, in addition to the internal configuration of the base station 100 in Embodiment 1, a beacon demodulation portion 500 for acquiring the identification number (ID) of a base station from a reference signal transmitted by an adjacent base station, a base station list 501 for holding relative coordinates of base stations, a list management portion 502 for performing management such as addition, deletion, etc. of information in the base station list 501, and a control processor 503 for controlling the reference signal generating portion 300, the positioning portion 305, the likelihood calculation portion 306, the beacon demodulation portion 500 and the list management portion 502. Incidentally, the beacon modulation portion 500 may be called 'base station ID number acquisition portion'.

The control processor 503 outputs a reference signal transmitting command to the reference signal generating portion 300. Upon reception of the command from the control processor 503, the reference signal generating portion 300 generates a reference signal used for positioning. For example, a UWB pulse signal is used as the reference signal. The transmission portion 301 converts a baseband signal of the reference signal generated by the reference signal generating portion, into a radio frequency signal. On this occasion, processes such as amplification, band limit, etc. are performed by the transmission portion 301. The transmission antenna 302 transmits the reference signal converted into the radio frequency signal by the transmission portion 301 to space.

The array antenna 303 receives a returned signal from the radio terminal and base station. The reception portion 304 converts the radio signal received through the array antenna 303, into a baseband signal. On this occasion, processes such as amplification, band limit, etc. are applied to the received signal.

The positioning portion 305 performs a process of obtaining a distance to the radio terminal or base station as a sender of the returned signal by using the reference signal in accordance with an input of a control signal generated separately based on a command given from the control processor 503. The positioning portion 305 calculates a direction of arrival of the reference signal based on the reference signal received through different antenna elements included in the array antenna based on a command given from the control processor 503 and inputs the direction of arrival to the control processor 503. With respect to a method of obtaining the distance, the time from transmission of a reference signal to reception of the returned reference signal from the radio terminal and base station as described above is measured. With respect to a method of measuring the direction of arrival, the direction of arrival is calculated by an arrival direction estimation algorism using the returned signal received through the antenna elements as described above.

The beacon demodulation portion 500 receives, as an input, the reference signal converted into the baseband signal and output from the reception portion 304. The beacon demodulation portion 500 demodulates a unique base station ID allocated to each base station and transmitted after superposed on the reference signal, and outputs a base station ID to the control processor 503. As a result, the base station which transmitted the reference signal can be identified. By identifying the reference signal, adjacent base stations existing around the base station can be distinguished. Accordingly, an adjacent base station from which relative coordinates can be acquired can be selected.

The likelihood calculation portion 306 receives, as an input, the reference signal converted into the baseband signal and output from the reception portion 304. The likelihood calculation portion 306 calculates likelihood indicating likelihood of a positioning result obtained based on waves of arrival. A method of calculating likelihood based on reception power can be conceived. Likelihood is a value indicating likelihood of the obtained positioning result. When attention is paid to reception power of waves of arrival, there is a high possibility that an accurate value will be obtained as a positioning result obtained by using waves of arrival high in reception power because the waves of arrival are hardly affected by noise. However, as reception power becomes lower, the influence of noise becomes so large that reliability of the positioning result is lowered. By using this characteristic, the likelihood calculation portion 306 outputs, as likelihood, the positioning result obtained as reception power of waves of arrival. Although description has been made in the case where reception power is used as likelihood by way of example, the invention is not limited thereto as long as characteristic of waves of arrival can be expressed.

The control processor 503 receives, as inputs, the positioning result output from the positioning portion 305, the base station ID output from the beacon demodulation portion 500 and the likelihood output from the likelihood calculation portion 306 and outputs these pieces of information to the communication portion 307. The control processor 503 performs control to create unified coordinates. The control method will be described later.

The base station list 501 is an information list of base stations existing in the unified coordinate system. A base station ID, a relative station ID indicating an adjacent base station acquiring relative coordinates, a positioning result of the adjacent base station and a flag indicating the origin are stored in the list. When all base stations have this list in common, base stations through which the origin coordinates are reached can be examined.

FIG. 8 is a view showing the base station list 501 in the radio positioning system shown in FIG. 6.

The base station list 501 shown in FIG. 8 includes a base station ID, a relative station ID, a positioning result of the relative station, and a master flag, successively in right order. The base station ID indicates the identification number of the base station. In a line, data of the same base station ID are shown. The relative station ID indicates the identification number of a base station which acquires relative coordinates by positioning an adjacent base station. The positioning result of the relative station is a result of positioning of position coordinates (x, y) of a base station having the relative station ID. The master flag is a flag indicating whether the base station is located in the origin or not. The master flag of 1 indicates that the base station is located in the origin. The master flag of 0 indicates that the base station is not located in the origin.

For example, referring to line 1 in the base station list 501 shown in FIG. 8, the base station (A in FIG. 6) having the base station ID of 1 has neither relative station ID nor positioning result of the relative station. Accordingly, as shown in FIG. 6, the base station A is located in the coordinate axis (origin). The master flag of the base station A is 1.

Referring to line 2 in the base station list 501 shown in FIG. 8, the base station (B in FIG. 6) having the base station ID of 2 shows that the relative station ID is 1 and the positioning result of the relative station is an x axis of −10 and a y axis of −10. Accordingly, the base station B is located in a place moved by −10 in the x direction and by −10 in the y direction relative to the base station A which is a station relative to the base station B. Because the base station B is not located in the coordinate axis (origin), the master flag of the base station B is 0.

Similarly, FIG. 8 shows the relative station ID, the positioning result of the relative station and the master flag with respect to each of base stations (C to G in FIG. 6) having base station IDs of 3 to 7. Accordingly, each base station can recognize a relative station in the base station list 501 and a position relative to the relative station by referring to the base station list 501. Incidentally, in the base station list 501 shown in FIG. 8, the positioning result of the relative station is expressed in two-dimensional orthogonal coordinate system (x axis, y axis) as an example but the invention is not limited thereto. For example, the positioning result of the relative station may be expressed in three-dimensional orthogonal coordinate system (x axis, y axis, z axis).

The list management portion 502 receives, as an input, a control signal given from the control processor 503 and performs management of the base station list 501 such as reading, addition and deletion of the base station list 501. The list management portion 502 is connected to the communication portion 307 through the control processor 503. Accordingly, the list management portion 502 is connected to the unifying portion 106 and another base station through the wire network 105. When a new base station is added to the base station list 501 or an existing base station is deleted from the base station list 501, the base station list 501 is broadcast to all base stations through the wire network 105. By broadcasting the base station list 501, the unifying portion 106 and all the other base stations can hold the latest base station list in common.

The communication portion 307 transmits data from the control processor 503 to the wire network 105. Data transmitted from the other base stations and the unifying portion 106 are transmitted to the control processor 503. Although description has been made in the case where the wire network 105 is used for the communication portion 307, the invention is not limited thereto. For example, a wireless network such as a wireless LAN may be used. In this case, easiness of installation of base stations is improved. When a base station is added or deleted, the network need not be installed or removed. When the position of a base station is changed, the labor for changing the network can be omitted.

The semi-passive tag 308 has the same configuration as in the radio terminal 104. The semi-passive tag 308 receives a positioning reference signal transmitted from a base station, amplifies the signal and transmits the signal to the base station. The semi-passive tag 308 is used for positioning from an adjacent base station. The adjacent base station transmits a positioning reference signal to the semi-passive tag of a base station to be positioned and receives a returned reference signal returned from the semi-passive tag to the base station. By measuring the distance and direction of arrival of this signal, the position of the adjacent base station can be measured.

Incidentally, the configuration of the radio terminal 104 in Embodiment 2 is the same as those of the radio terminal 104 and the unifying portion in Embodiment 1 and description thereof will be omitted. The configuration of the unifying portion 106 is the same except that the base station coordinate creation portion 401 creates unified coordinates by using the base station list.

A process of detecting the positions of base stations when there is a change in base station environment such as addition of a new base station, deletion of an existing base station, etc. in the radio positioning system in Embodiment 2 will be described below with reference to FIGS. 9A-9B, 10, 11A-11B, 12, 13A-13C, 14, 15A-15B, 16 and 17A-17C. In the radio positioning system in Embodiment 2 shown in FIGS. 10, 12, 14 and 16 for explaining the operations of base stations, only base stations are shown but the radio terminal 104, the wire network 105 for connecting the base stations to the unifying portion 106 and the unifying portion 106 are not shown. In the following description of Embodiment 2, a base station having a base station ID of n (n; natural number) is referred to as 'base station IDn'.

Figure 9B:
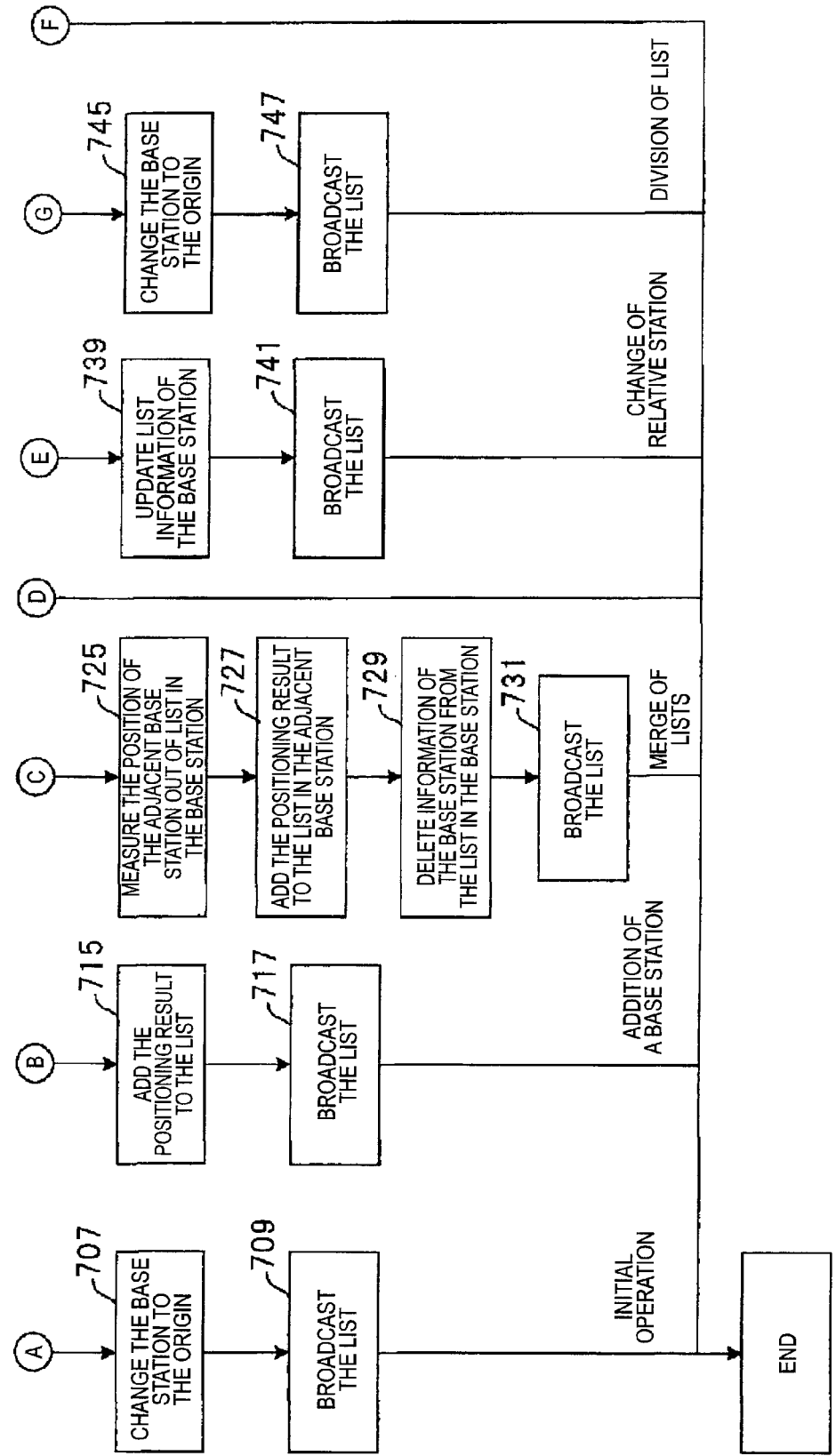

Processing performed by the control processor 503 of each base station for detecting the position of each base station when there is a change in base station environment such as addition of a new base station, deletion of an existing base station, etc. in the radio positioning system in Embodiment 2 will be described with reference to FIGS. 9A and 9B. FIGS. 9A and 9B are flow charts showing a procedure of processing in the control processor 503 of a base station when there is a change in base station environment. In FIGS. 9A and 9B, the base station list is referred to as list.

To construct unified coordinates autonomous-distributedly, the control processor 503 receives, as inputs, the positioning result output from the positioning portion 305, the base station ID output from the beacon demodulation portion 500 and the likelihood output from the likelihood calculation portion 306 and outputs these pieces of information to the communication portion 307.

First, the control processor 503 starts a process of constructing unified coordinates.

In step 701, each base station acquires a base station ID from a positioning reference signal transmitted from an adjacent base station.

Then, in step 703, confirmation is made as to whether the base station holds the base station list or not. When the base station does not hold the base station list (NO), processing goes to step 705. When the base station holds the base station list (YES), processing goes to step 719.

Then, in step 705, determination is made as to whether there is any adjacent base station in the base station list held by the base station or not, and determination is made as to whether the adjacent base station per se holds the base station list or not, when there is any adjacent base station.

(Initial Operation of Base Station)

When the step 705 results in that there is no adjacent base station in the base station list held by the base station (NO) or that there is an adjacent base station but the adjacent base station per se does not hold the base station list (NO), processing goes to step 707 to create a base station list so that the base station is located in the origin. Processing then goes to step 709 in which the created list is broadcast through the wire network 105. Thus, processing is terminated. On this occasion, whether there is any adjacent base station or not can be determined based on whether the base station ID acquired in step 701 is present in the base station list held by the base station or not. By this processing, unified coordinates based on the base station as the origin can be created newly when there is no unified coordinate.

(Addition of Base Station)

When the step 705 results in that there is an adjacent base station in the base station list held by the base station and that the adjacent base station per se holds the base station list (YES), processing goes to step 711 in which the base station list held by the adjacent base station is copied from the adjacent base station to the base station list held by the base station, through the wire network 105.

Then, processing goes to step 713 in which the position to the adjacent base station is measured.

Then, processing goes to step 715 in which position information of the adjacent base station is added to the copied base station list. In this manner, the base station list held by the base station is updated.

Finally, processing goes to step 717 in which the updated base station list is broadcast. Thus, processing is terminated. When, for example, one base station is added, coordinates of the base station can be added to an existing unified coordinate system by processing designated by the steps 701, 703, 705, 711, 713 and 715.

(Merge of List)

In step 703, confirmation is made as to whether the base station holds the base station list or not. When the base station holds the base station list (YES), processing goes to step 719.

Then, in step 719, confirmation is further made as to whether there is any adjacent base station out of the base station list held by the base station. When there is an adjacent base station out of the base station list held by the base station, processing goes to step 721.

In step 721, the base station list held by the adjacent base station is copied from the adjacent base station out of the base station list held by the base station to the list held by the base station, through the wire network 105 and processing goes to step 723.

Then, in step 723, the base station ID located in the coordinate axis (origin) in the base station list in which the base station is present is compared with the base station ID located in another coordinate axis (another origin) in the list which is held by the adjacent base station and in which the base station is not present. When the comparison of the base station IDs results in that the ID of the base station located in the coordinate axis (origin) in the base station list in which the base station is present is larger than the ID of the other base station located in the other coordinate axis (other origin) in the list which is held by the adjacent base station and in which the base station is not present (YES), processing goes to step 725.

Then, in step 725, the base station measures the position of the adjacent base station which is not present in the base station list held by the base station, and processing goes to step 727.

Then, in step 727, the base station adds position information of the adjacent base station and information of the base station to the base station list held by the adjacent base station, and processing goes to step 729.

Then, in step 729, the base station deletes information of the base station from the base station list held by the base station, and processing goes to step 731.

Finally, in step 731, the base station list held by the base station and the base station list held by the adjacent base station are broadcast through the wire network 105 and processing is terminated. Incidentally, when the comparison of the base station IDs in the step 723 results in that the ID of the base station located in the coordinate axis (origin) in the base station list in which the base station is present is not larger than the ID of the other base station located in the other coordinate axis (other origin) in the list which is held by the adjacent base station and in which the base station is not present (NO), processing is terminated.

(Change of Relative Station)

When the step 719 results in that there is no adjacent base station which is not present in the base station list held by the base station, processing goes to step 733.

Then, in step 733, confirmation is made as to whether or not a station relative to the base station is present in the base station list held by the base station. When there is a relative station (YES), processing is terminated. When there is no relative station (NO), processing goes to step 735.

Then, in step 735, confirmation is made as to whether an adjacent base station not serving under the base station is present among base stations in the base station list held by the base station. When the adjacent base station is present (YES), processing goes to step 737. When the adjacent base station is not present (NO), processing goes to step 743. The term "base station serving under the base station" means such a base station that the base station is reached when relative stations are traced back. For example, in the radio positioning system in Embodiment 2 shown in FIG. 6, base stations serving under the base station ID4 are base stations ID5, ID6 and ID7.

Then, in step 737, the position of an adjacent base station not serving under the base station is measured. In step 739, the ID and positioning result of the station relative to the base station in the base station list held by the base station are updated by use of a new positioning result. After the base station list held by the base station is updated, processing goes to step 741.

In step 741, the updated base station list held by the base station is broadcast and processing is terminated.

(Division of List)

When the step 735 results in that an adjacent base station not serving under the base station is not present among base stations in the base station list held by the base station, processing goes to step 743.

Then, in step 743, the base station list held by the base station is divided into a list of base stations serving under the base station and a list of other base stations. Then, in step 745, the origin of the list including the base station is changed to the base station and processing goes to step 747.

Then, in step 747, the divided base station list is broadcast and processing is terminated.

When control is made as shown in the flow charts of FIGS. 9A and 9B as described above, coordinates of the base station can be created autonomous-distributedly so that base stations can hold the coordinates in common. Even when the number and arrangement of base stations are changed, coordinates can be reconstructed automatically.

A specific example when there is a change in base station environment in the radio positioning system in Embodiment 2 will be described below with reference to the flow charts shown in FIGS. 9A and 9B.

(Addition of Base Station)

Figure 10:
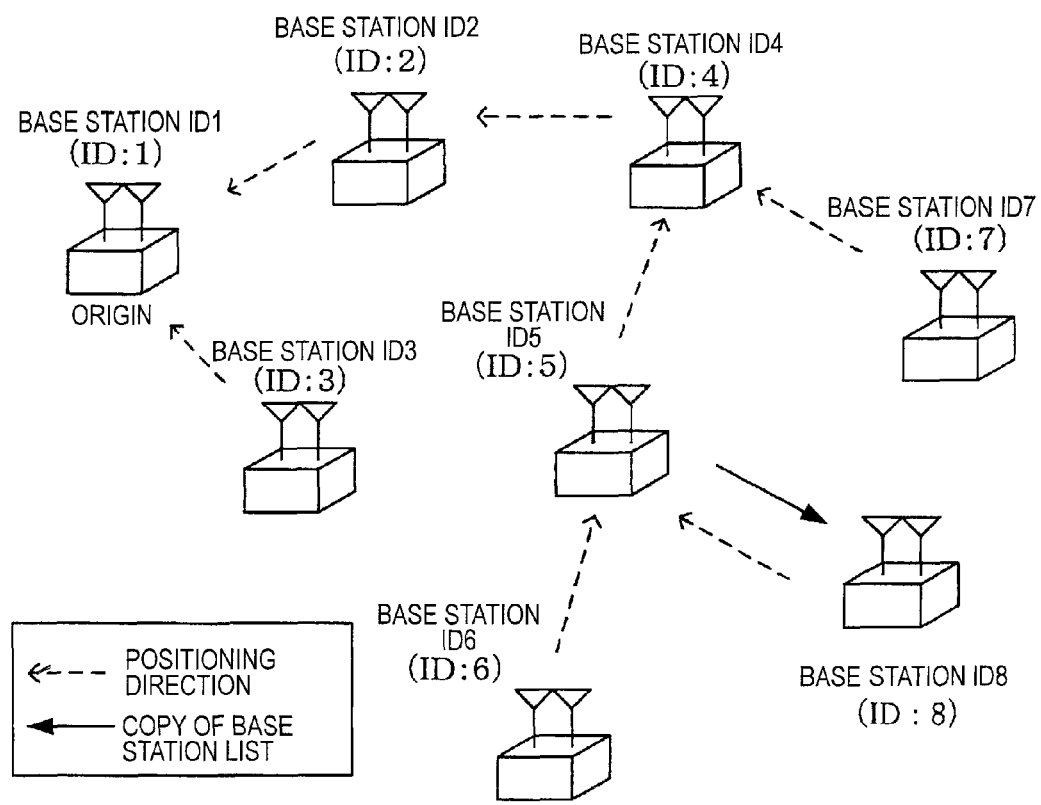
FIG. 10 is a diagram showing the radio positioning system according to Embodiment 2 of the invention when a base station is added.
Figures 11A, 11B:
FIG. 11A is a view showing the base station list (before addition of a base station)
FIG. 11B is a view showing the base station list (after addition of a base station)

An example in which a new base station is added to an existing radio positioning system will be described specifically with reference to FIG. 10 and FIGS. 11A and 11B. In the flow charts shown in FIGS. 9A and 9B, the steps 703, 705, 711, 713, 715 and 717 correspond to this specific example. FIG. 10 is a diagram showing the radio positioning system in Embodiment 2 when a new base station is added. FIG. 11A is a view showing the base station list before the base station is added. FIG. 11B is a view showing the base station list after the base station is added. Incidentally, the configuration of the base station list shown in FIGS. 11A and 11B is the same as in FIG. 8 and description thereof will be omitted.

In the radio positioning system shown in FIG. 10, assume that the newly added base station is a base station ID8 and base stations ID5, ID6 and ID7 are located in a range which a positioning reference signal transmitted by the base station ID8 can reach. Moreover, for the sake of explanation, assume that one ID5 of base stations ID5, ID6 and ID7 adjacent to the base station ID8 is a station relative to the base station ID8. However, the base station ID8 may be set as a station relative to one of the base stations ID5, ID6 and ID7. Or the base stations ID5, ID6 and ID7 may be set as relative stations so that positioning is performed to obtain relative coordinates. In this manner, measuring accuracy can be improved. A method of calculating an average of measured results or a method of performing weighted synthesis by using reception power of waves of arrival can be used as a method of synthesizing positioning results.

The operation of the base station ID8 will be described below with reference to the flow charts of FIGS. 9A and 9B.

First, the base station ID8 confirms that there is no base station list in the base station (step 701 in FIG. 9A). This is because the base station does not hold any base station list when powered on.

Then, the base station ID8 confirms the existence of the adjacent base stations ID5 to ID7. The base station ID8 receives a reference signal from the adjacent base station ID5 and confirms whether the adjacent base station ID5 holds the base station list or not (step 705 in FIG. 9A). Here, the adjacent base station ID5 holds the base station list.

Then, the base station ID8 confirms that the base station ID5 holds the base station list and copies the base station list of the base station ID5 from the base station ID5 (step 711 in FIG. 9A).

Then, the base station ID8 measures the position of the base station ID5 (step 713 in FIG. 9A).

Then, the base station ID8 adds a positioning result of the base station ID5 to the base station list of the base station ID8 (step 715 in FIG. 9B).

Finally, the base station ID8 broadcasts the base station list through the wire network 105 (step 717 in FIG. 9B) and processing is terminated.

When the base station ID8 operates in the aforementioned steps, the base station list changes from FIG. 11A to FIG. 11B.

As shown in FIG. 11B, in the base station list to which the base station ID8 has been added, 5 is set as the relative station ID corresponding to the base station ID8, x:−8, y:10 is set as the positioning result from the relative station, and 0 is set as the master flag. Accordingly, the unifying portion 106 can reconstruct unified coordinates based on the base station ID1 as the origin by using relative coordinates of the base stations ID1 to ID8.

When the base stations ID1 to ID8 measure the positions of adjacent base stations respectively as described above, the unifying portion 106 can map the base stations (ID1 to ID8) on a unified coordinate system. Accordingly, even when the measurable range of one base station is limited, a wide-range unified coordinate system can be created. The unifying portion 106 performs a process of transforming the position of the radio terminal measured by the base stations into coordinates on the aforementioned unified coordinate system. Therefore, each of the base stations ID1 to ID8 can measure the position of the radio terminal existing in a range where the base station can transmit/receive a reference signal, in terms of coordinates based on the base station as the origin. The base station may transmit coordinate data measured based on the base station as the origin to the unifying portion 106 through the wire network 105, so that each base station need not hold the unified coordinates. Accordingly, even when the configuration and position of each base station is changed, unified coordinates can be reconstructed easily.

(Merge of List)

An example in which one base station is newly added between two radio positioning systems defined in different unified coordinate systems to thereby change the two radio positioning systems defined in different unified coordinate systems to one radio positioning system defined in a new unified coordinate system will be described specifically below with reference to FIG. 12 and FIGS. 13A, 13B and 13C. In the flow charts shown in FIGS. 9A and 9B, the steps 703, 719, 723, 721, 725, 727, 729 and 731 correspond to this specific example.

Figure 12:
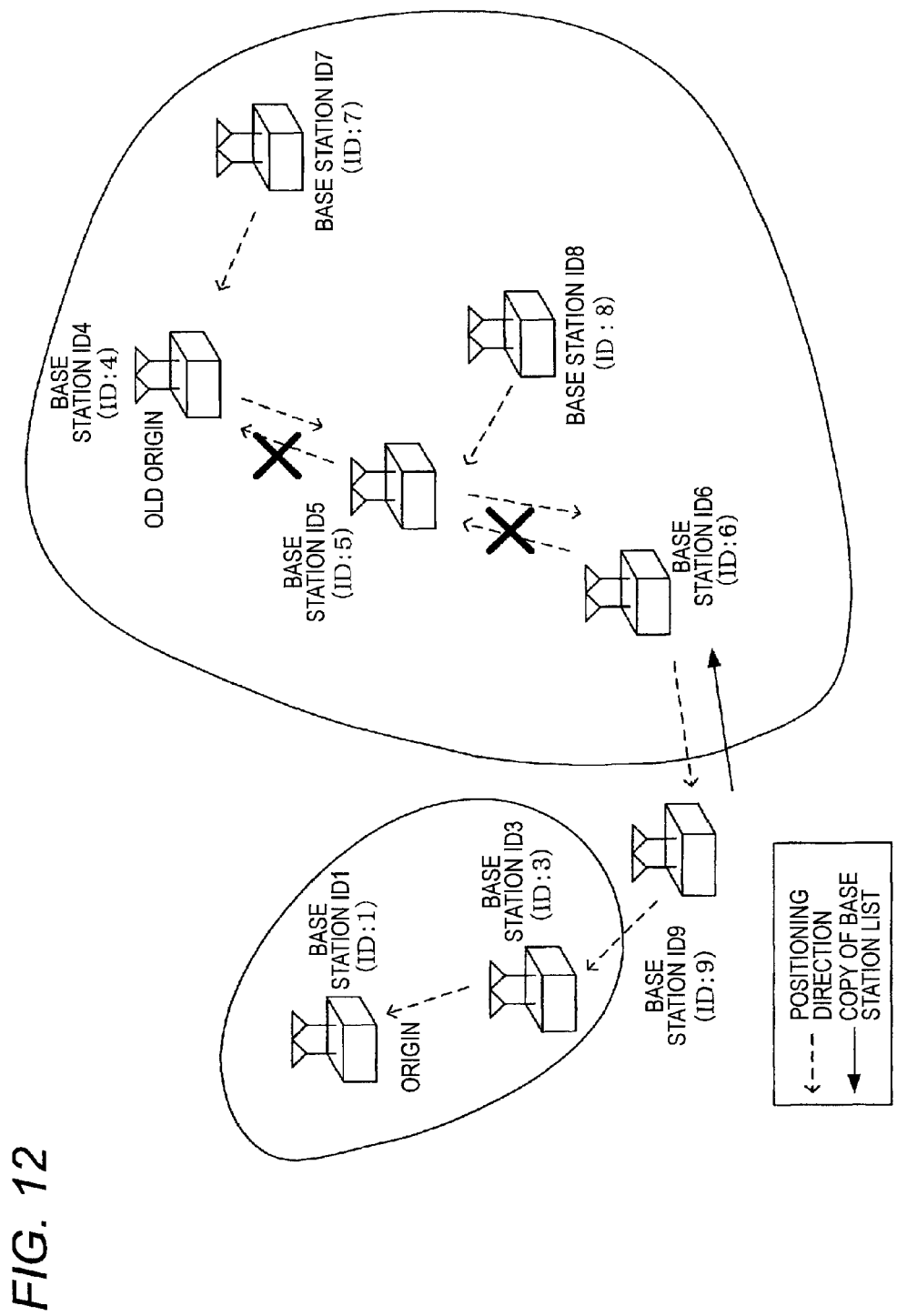
FIG. 12 is a diagram showing a radio positioning system in Embodiment 2 of the invention which is formed by merging two radio positioning systems.

FIG. 12 is a diagram showing the radio positioning system formed in such a manner that two radio positioning systems defined in different unified coordinate systems are merged due to addition of a new base station. FIG. 13A is a view showing the base station list of one of the two radio positioning systems defined in different unified coordinate systems. FIG. 13B is a view showing the base station list of the other radio positioning system. FIG. 13C is a view showing a base station list of a new radio positioning system formed in such a manner that the two radio positioning systems are merged.

As shown in FIG. 12, there are one radio positioning system including base stations ID1 and ID3 and another radio positioning system including base stations ID4 to ID8.

The process of merging the base station lists is performed by two steps. The first step is a process of adding information of a new base station ID9 to the base station list of the radio positioning system including the base stations ID1 and ID3. The second step is a process of forming one base station list by merging base station lists of two radio positioning systems.

[First Step: Addition of Base Station]

As shown in FIG. 12, in the first step, a base station ID9 is disposed in a position where the base station ID9 can receive reference signals from base stations ID3 and ID6. On this occasion, a process of adding the base station ID9 to a unified coordinate system including base stations ID1 and ID3 is performed in the same manner as the addition method shown in FIG. 10 and FIGS. 11A and 11B.

[Second Step: Merge of Lists]

A process of forming one base station list by merging a base station list of the radio positioning system including the base stations ID1 and ID3 and the newly added base station ID9 and a base station list of the other radio positioning system including base stations ID4 to ID8 will be described below with reference to FIGS. 9A and 9B and FIGS. 13A to 13C.

First, the base station ID6 confirms the existence of the base station list held by the base station ID6 (step 703 in FIG. 9A).

Then, the base station ID6 confirms that the base station ID9 not present in the list held by the base station ID6 is present as an adjacent base station (step 719 in FIG. 9A).

Then, the base station ID6 copies the base station list from the base station ID9 as an adjacent base station because the base station ID9 not present in the base station list held by the base station ID6 is present (step 721 in FIG. 9A).

Then, the base station ID6 compares the base station list of the base station ID6 and the base station list of the adjacent base station by using the base station list copied from the base station ID9 as an adjacent base station and compares the IDs of the base stations located in the coordinate axes (origins) (step 723 in FIG. 9A). In FIGS. 13A to 13C, the base stations located in the coordinate axes (origins) are base stations ID1 and ID4 and the base station ID1 having a smaller base station ID is set as the origin after merging the lists.

Then, the base station ID6 positions the base station ID9 which is a station relative to the base station ID6 (step 725 in FIG. 9B).

Then, the positioning result and information of the base station ID6 are added to the base station list of the base station ID9 (step 727 in FIG. 9B).

Then, the base station ID6 deletes information of the base station ID6 and base stations serving under the base station ID6 from the base station list held by the base station ID6 (step 729 in FIG. 9B).

Finally, the base station ID9 broadcasts the changed base station list through the wire network 105 and processing is terminated (step 731 in FIG. 9B).

By the aforementioned steps, the base station ID6 is moved to the radio positioning system including the base stations ID1, ID3 and ID9. Incidentally, the base stations ID5 and ID4 can be moved to the unified coordinate system including the base stations ID1, ID3, ID6 and ID9 successively in the same procedure as described above, so that two unified coordinate systems can be merged into one unified coordinate system.

FIG. 13C shows an example of the base station list of the new radio positioning system in one unified coordinate system created by the aforementioned steps. The base station ID9 is a newly added base station. IDs of stations relative to the base stations ID4, ID5 and ID6 are changed. Although the base stations ID1 and ID4 were the origins before merging as shown in FIGS. 13A and 13B, only the base station ID1 is the origin after merging as shown in FIG. 13C.

(Change of Relative Stations)

A specific example of change of relative stations will be described below with reference to FIG. 14 and FIGS. 15A and 15B. In the flow charts shown in FIGS. 9A and 9B, the steps 703, 719, 733, 735, 737, 739 and 741 correspond to this specific example.

Figure 14:
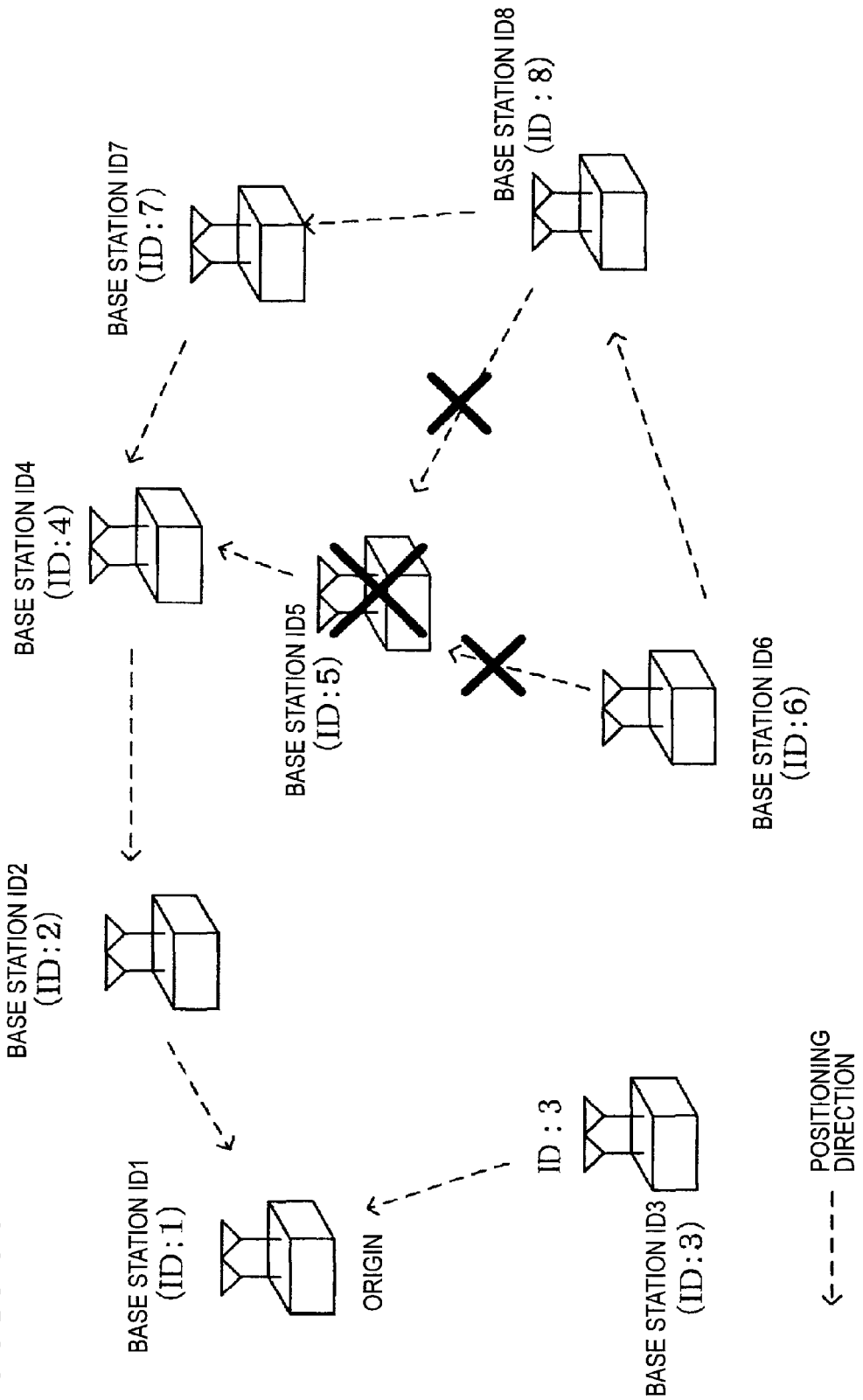
FIG. 14 is a diagram showing a radio positioning system in Embodiment 2 when a base station changes relative stations.

FIG. 14 is a diagram showing the radio positioning system in Embodiment 2 in the case where base stations change relative stations. FIG. 15A is a view showing an example of the base station list before change of relative stations. FIG. 15B is a view showing an example of the base station list after change of relative stations.

When a base station ID5 is deleted from the radio positioning system shown in FIG. 14, base stations ID6 and ID8 performs positioning again to change relative stations.

First, because the base station ID5 which is a relative station is deleted, the base station ID8 determines whether there is any base station list in the base station ID8 (step 703 in FIG. 9A).

Then, when there is a base station list, the base station ID8 determines whether there is any adjacent base station not present in the base station list (step 719 in FIG. 9A).

Then, when there is no adjacent base station not present in the base station list, the base station ID8 determines whether there is any relative station in the base station list (step 733 in FIG. 9A). Here, a station relative to the base station ID8 is the base station ID5 which has been already deleted. Accordingly, there is no relative station in the base station list held by the base station ID8 (see FIG. 15A).

Then, because there is no station relative to the base station ID8 in the base station list, the base station ID8 determines whether there is any adjacent base station not serving under the base station ID8 (step 735 in FIG. 9A). Base stations ID7 and ID6 are adjacent base stations not serving under the base station ID8. The base station ID7 exists as an adjacent base station not serving under the base station ID8.

Then, the base station ID8 positions the base station ID7 which is an adjacent base station not serving under the base station ID8 (step 737 in FIG. 9A).

Then, the base station ID8 updates information of the base station ID8 in the base station list of the base station ID8 based on a positioning result of the base station ID7 (step 739 in FIG. 9B).

Finally, the base station ID8 broadcasts the updated base station list through the wire network 105 and processing is terminated.

By the aforementioned steps, the base station ID8 can position another adjacent base station ID7 not serving under the base station ID8 and can set the positioned base station ID7 as a station relative to the base station ID8 newly even when the base station ID5 which was a relative station was deleted. That is, the base station ID8 can change the relative station from the base station ID5 deleted from the base station list to the base station ID7 autonomously. Incidentally, the base station ID 6 relating to the base station ID5 as a relative station can change the relative station from the base station ID5 to the base station ID8 by executing the same process as in the base station ID8 (see FIG. 15B). In this manner, the radio positioning system shown in FIG. 14 reconstructs itself autonomously even when a base station is deleted.

FIG. 15A is a view showing the base station list before change of relative stations. FIG. 15B is a view showing the base station list after change of relative stations. In FIG. 15A, the base station ID5 is deleted from the base station list. In FIG. 15B, relative station IDs and positioning results of the relative stations with respect to the base stations ID6 and ID8 are changed (see hatched portions in FIG. 15B).

As described above, even when a base station is deleted from the radio positioning system according to Embodiment 2, base stations per se relating to the deleted base station as a relative station in the radio positioning system can position other adjacent base stations not serving under the base stations and can set the positioned base stations as relative stations respectively. Accordingly, the radio positioning system according to Embodiment 2 can reconstruct the unified coordinate system of the radio positioning system autonomous-distributedly even when a base station is deleted from the radio positioning system.

(Division of List)

An example in which a base station list is divided to form two radio positioning systems having different unified coordinate systems will be described specifically below with reference to FIG. 16 and FIGS. 17A, 17B and 17C. In the flow charts shown in FIGS. 9A and 9B, the steps 703, 719, 733, 735, 743, 745 and 747 correspond to this specific example.

Figure 16:
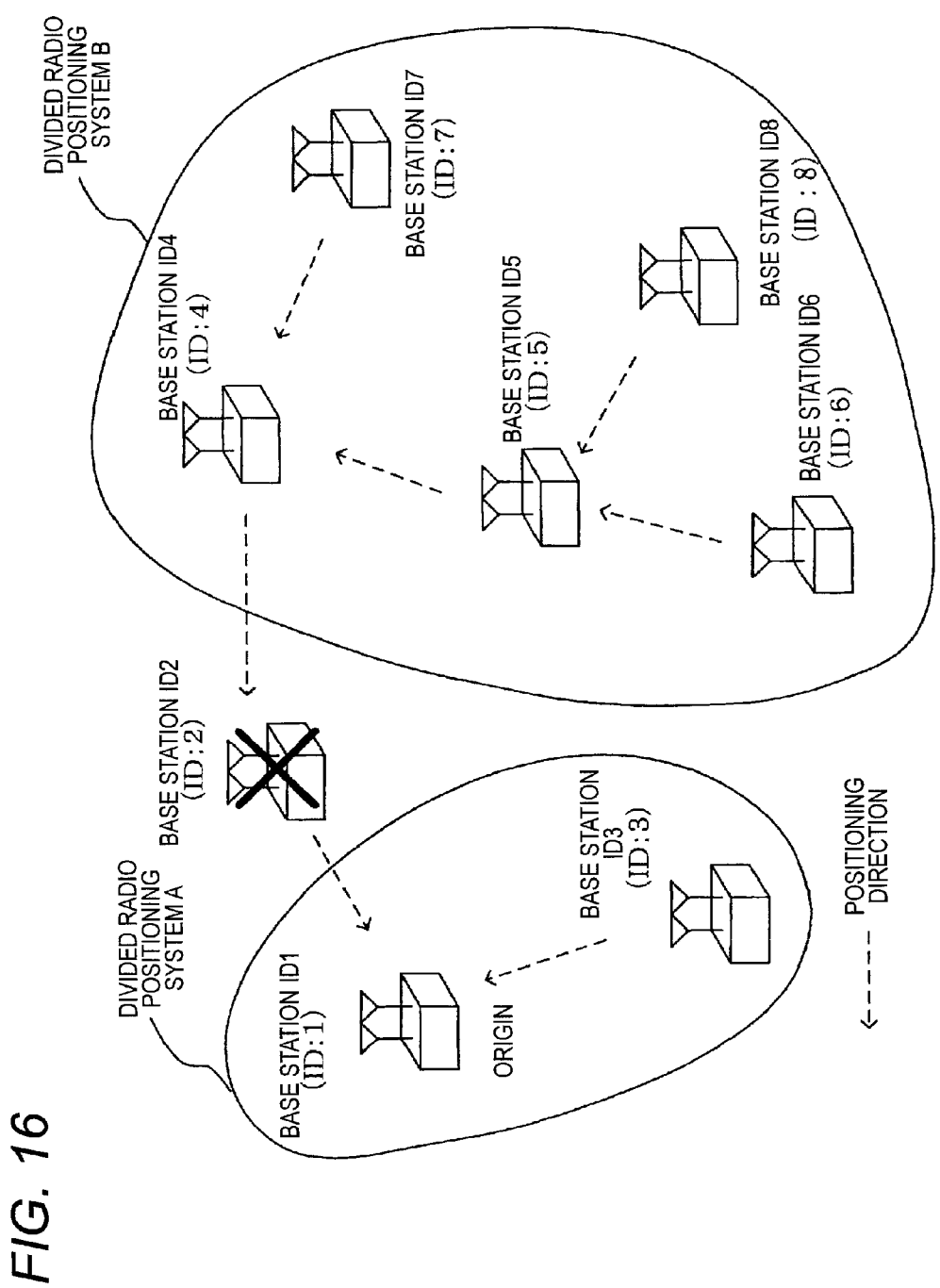
FIG. 16 is a diagram showing the radio positioning system in Embodiment 2 when the base station list is divided.

FIG. 16 is a diagram showing the radio positioning system in Embodiment 2 in the case where a base station list is divided. FIG. 17A is a view showing the base station list (before division) of the radio positioning system in Embodiment 2. FIGS. 17B and 17C are views showing the divided base station lists of the radio positioning system in Embodiment 2.

In FIG. 16, a base station ID2 which a station relative to a base station ID4 is deleted. In this case, the base station ID4 searches for a relative station to be newly positioned but there is no base station other than base stations ID5 to ID8 serving under the base station ID4. For this reason, while the base station ID4 is set as the origin, the radio positioning system including the base stations ID1 to ID8 will be divided into two radio positioning systems having different unified coordinate systems.

First, the base station ID4 confirms whether there is a base station list in the base station ID4 (step 703 in FIG. 9A). Here, the base station ID4 holds the base station list.

Then, because the base station ID4 holds the base station list, the base station ID4 confirms whether there is any adjacent base station absent in the base station list held by the base station ID4 (step 719 in FIG. 9A). As shown in FIG. 16, there is no adjacent base station absent in the base station list held by the base station ID4.

Then, because there is no adjacent base station absent in the base station list held by the base station ID4, the base station ID4 confirms whether or not there is any station relative to the base station ID4 in the base station list held by the base station ID4 (step 733 in FIG. 9A). Here, the base station ID2 which is a station relative to the base station ID4 has been deleted.

Then, because the base station ID2 which is a station relative to the base station ID4 has been deleted, the base station ID4 confirms whether or not there is any adjacent base station not serving under the base station ID4 (step 735 in FIG. 9A). As shown in FIG. 16, there is no adjacent base station not serving under the base station ID4.

Then, the base station ID4 divides the base station list of the base station ID4 into a list of base stations serving under the base station ID4 and a list of other base stations (step 743 in FIG. 9A). Here, as shown in FIG. 16, the radio positioning system including the base stations ID1 to ID8 is divided into a radio positioning system A including the base stations ID1 and ID3 and a radio positioning system B including the base stations ID4, ID5, ID6, ID7 and ID8 in accordance with the divided base station lists.

Then, the base station ID4 changes itself to be located on the coordinate axis (origin) in the base station list of the base station ID4 (step 745 in FIG. 9B).

Finally, the base station ID4 broadcasts the divided base station lists through the wire network 105.

FIGS. 17A to 17C are views showing an example of the base station list of the radio positioning system before and after division of the base station list. The base station list of the radio positioning system including the base stations ID1 to ID8 shown in FIG. 17A is divided into the base station list of the radio positioning system A including the base stations ID1 and ID3 and the base station list of the radio positioning system B including the base stations ID4, ID5, ID6, ID7 and ID8, as shown in FIGS. 17B and 17C. In FIG. 17A before division of the base station list, there are a station ID relative to the base station ID4, a positioning result of the relative station and a master flag of 0. However, in FIG. 17C after division of the base station list, there is neither station ID relative to the base station ID4 nor positioning result of the relative station and there is a master flag of 1 because the base station ID4 has been processed to be located on the origin.

By the aforementioned steps, the radio positioning system according to Embodiment 2 can be divided into two radio positioning systems having different unified coordinate systems autonomous-distributedly without manual setting even when a base station is deleted from the radio positioning system including a plurality of base stations.

As described above, in the radio positioning system according to Embodiment 2 of the invention, coordinates of base stations can be constructed automatically without presetting by the steps of: forming radio tags each having the same configuration as the radio terminal to be positioned so that the radio tags are mounted in single-point positioning base stations respectively; and forming the coordinates of the base stations by using the radio tags. When a new base station is added to the once constructed coordinate system or an existing base station is deleted from the once constructed coordinate system, a unified coordinate system can be reconstructed automatically. Accordingly, easiness of installation of devices can be improved. As a further effect, when an averaging process or a weighted synthesizing process is applied to results measured by the base stations with use of the created unified coordinate system, accuracy of measured results can be improved.

Embodiment 3

Figure 18:
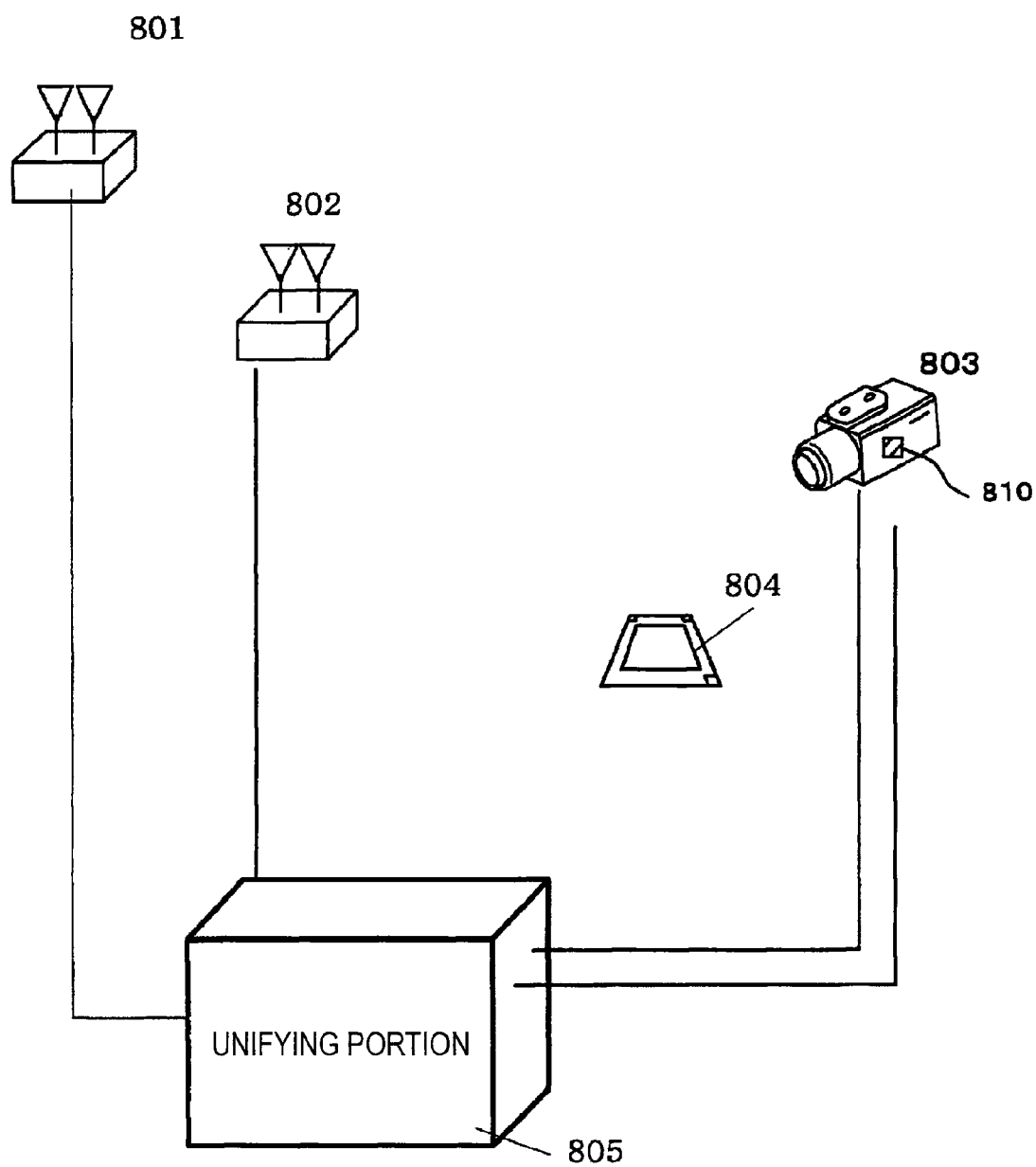
FIG. 18 is an overall configuration diagram of a radio positioning system according to Embodiment 3 of the invention.

A radio positioning system according to Embodiment 3 will be described below with reference to FIG. 18. FIG. 18 is an overall configuration diagram of the radio positioning system according to Embodiment 3.

The radio positioning system according to Embodiment 3 includes a first reader 801, a second reader 802, a positioning camera 803, a radio terminal tag 804, and a unifying portion (manager) 805. The first and second readers 801 and 802 serve as base stations. The radio terminal tag 804 is a target of positioning.

Each of the first and second readers 801 and 802 has the same configuration as the base station in Embodiment 1 shown in FIG. 3.

The positioning camera 803 has a positioning semi-passive tag 810, and a communication portion not shown but capable of communicating with the unifying portion by radio. The positioning camera 803 has a function of measuring the position of an object based on captured image aberration. A stereo camera having a plurality of image-capturing portions can be used as an example of the positioning camera 803.

The radio terminal tag 804 as a target of positioning and the unifying portion (manager) 805 have the same configuration as the radio terminal 104 and the unifying portion 106 in Embodiment 1, respectively, and detailed description about the configuration will be omitted.

The radio positioning system according to Embodiment 3 is assumed to construct a unified coordinate system while the position of the first reader 801 is set as a coordinate axis (origin).

In the radio positioning system according to Embodiment 3, the absolute position and sight line direction of the positioning camera 803 are corrected based on positioning results of the positioning camera 803 and the second reader 802. The operation of the radio positioning system according to Embodiment 3 will be described below with reference to FIG. 18.

First, the first and second readers 801 and 802 measure positions relative to each other by using the positioning semi-passive tag.

Then, the second reader 802 measures the positions of the radio terminal tag 804 and the positioning camera 803. The measured results are transmitted to the unifying portion (manager) 805 through the communication portion.

The positioning camera 803 measures the position of an object in which the radio terminal tag 804 is mounted, by using the theory of a stereo camera. The measured result is transmitted to the unifying portion (manager) 805 through the communication portion.

The unifying portion 805 calculates relative positions of the second reader 802 and the tag 804 and relative positions of the second reader 802 and the positioning camera 803 based on the positioning results obtained from the second reader 802 and the positioning camera 803. Accordingly, when the direction from the positioning camera 803 to the tag 804 based on the coordinate axis of the second reader 802 is compared with the direction from the positioning camera 803 to the tag 804 based on the coordinate axis of the positioning camera 803, the sight line direction of the positioning camera 803 based on the coordinate axis of the second reader 802 can be estimated.

Because the absolute positions of the first and second readers 801 and 802 are acquired in advance, the unifying portion 805 can determine the absolute positions of the radio terminal tag 804 and the positioning camera 803 and the sight line direction of the positioning camera 803 in the aforementioned manner based on the position relation between the first and second readers 801 and 802.

As described above, in the radio positioning system according to Embodiment 3, the relative positions of the readers 801 and 802, the radio terminal tag 804 and the positioning camera 803 are obtained and correction data are obtained by comparing the positioning result of the radio terminal tag 804 and the measurement result of the positioning camera 803, so that positioning of a radio terminal can be performed easily and accurately.

Embodiment 4

A radio positioning system according to Embodiment 4 will be described below with reference to FIG. 19. In the radio positioning system according to this embodiment, readers 2001 and 2002 correspond to the base stations described in each of the aforementioned embodiments and a radio terminal tag 2005 not mounted in any reader corresponds to the radio terminal 104. Accordingly, the same parts as those in the aforementioned embodiments are referred to by the same numerals to avoid duplicate description, except that functions and operations of parts different in configuration will be described.

Figure 19:
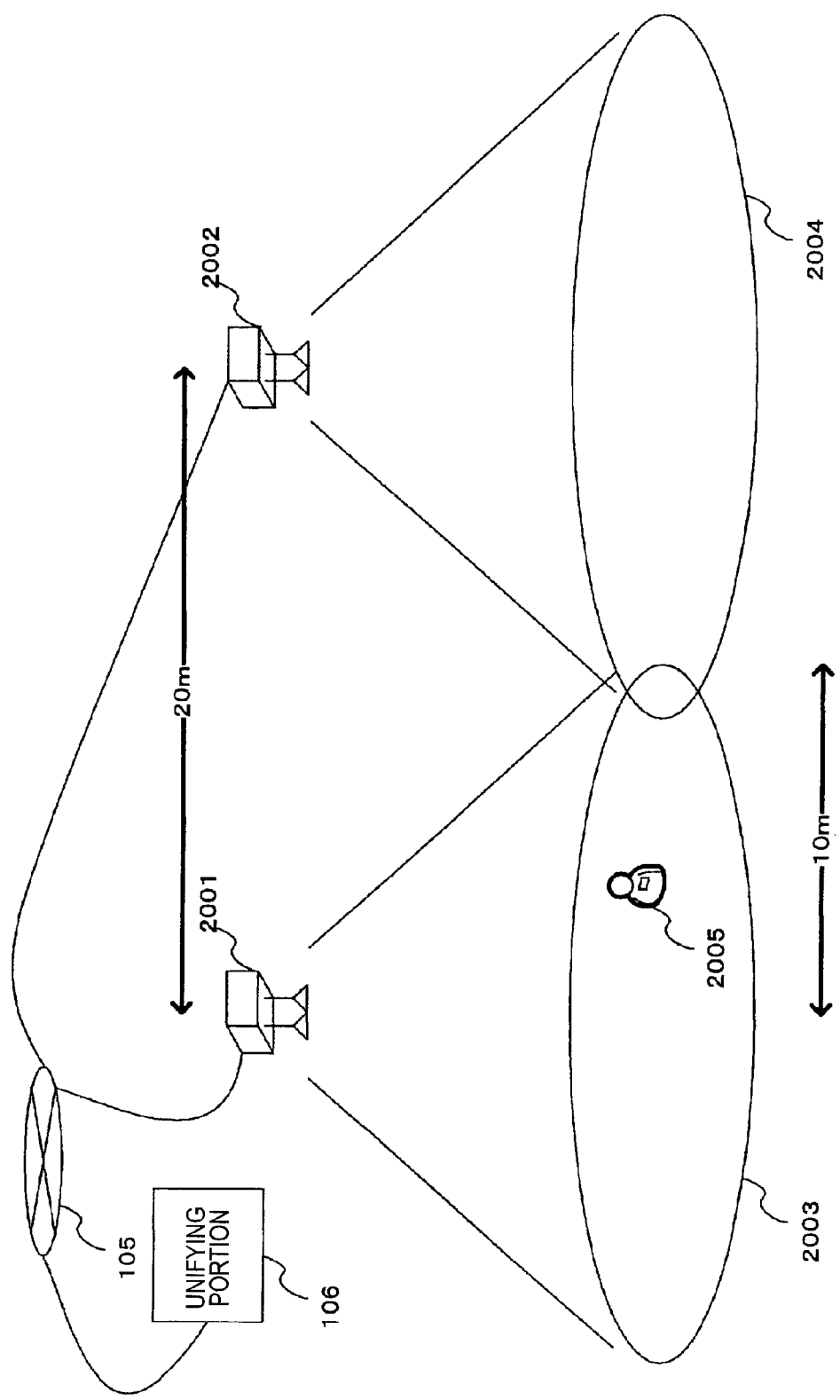
FIG. 19 is a diagram showing an environment in which a radio positioning system according to Embodiment 4 of the invention is provided.

FIG. 19 is a diagram showing an environment in which the radio positioning system is provided. The environment shown in FIG. 19 includes the reader 2001, the reader 2002, an area 2003, an area 2004, the radio terminal tag 2005, and the unifying portion 106. In FIG. 19, the respective readers 2001 and 2002 are connected to the unifying portion 106 by the wire cable 105 such as an Ethernet (registered trademark) cable.

Although the unifying portion 106 creates unified coordinates based on data measured by the readers, detailed description of the unifying portion 106 will be omitted because the unifying portion 106 has the same configuration as that of the unifying portion 106 in each of the aforementioned embodiments.

The reader 2001 positions the radio terminal tag 2005 located in a range (corresponding to the area 2003) of 10 m radius around the reader 2001. The reader 2001 is placed at a height of about 3-4 m. This is for the purpose of reducing the influence of an obstacle assumed in an office environment or the like. When use in an indoor environment such as an office environment or a home environment is assumed, it is preferable that the reader is provided on a ceiling. The area 2003 indicates a range in which the reader 2001 can measure the position of the radio terminal tag. The area 2003 is a circle of 10 m radius around the reader 2001.

The reader 2002 which is adjacent to the reader 2001 positions the radio terminal tag located in a range (corresponding to the area 2004) of 10 m radius around the reader 2002. The reader 2002 is placed at the same height as the reader 2001. The area 2004 indicates a range in which the reader 2002 can measure the position of the radio terminal tag. The area 2004 is a circle of 10 m radius around the reader 2002.

The readers 2001 and 2002 are provided so that the areas 2003 and 2004 are adjacent to each other but slightly overlap each other. When the readers 2001 and 2002 are provided in the areas 2003 and 2004 respectively in this manner, the distance between the readers 2001 and 2002 is 20 m because the areas of 10 m radius are formed so as to be adjacent to each other.

In this embodiment, there is no obstacle between the readers 2001 and 2002 because the installation place of the readers 2001 and 2002 is assumed to be a ceiling located at a height of about 3-4 m by way of example. Accordingly, a line-of-sight environment is formed between the readers 2001 and 2002.

In the radio positioning system described in each of Embodiments 1 and 2, a radio terminal having the same function as the radio terminal 104 is mounted in each base station and a certain base station measures the position of a base station adjacent to the certain base station to thereby configure a unified coordinate system in the radio positioning system according to each embodiment. In this embodiment, there is however a possibility that a signal used for positioning will be attenuated to make accurate positioning impossible when the adjacent base station positioning method described in Embodiments 1 to 3 is simply applied to this embodiment, because the distance between the reader 2001 and the reader 2002 adjacent to the reader 2001 is 20 m.

Therefore, in this embodiment, each reader acquires an additional gain by performing a process of adding a signal transmitted from a radio terminal tag mounted in another adjacent reader, and specifies the other reader having the radio terminal tag mounted therein, based on a tag ID contained in the transmitted signal.

Figure 20:
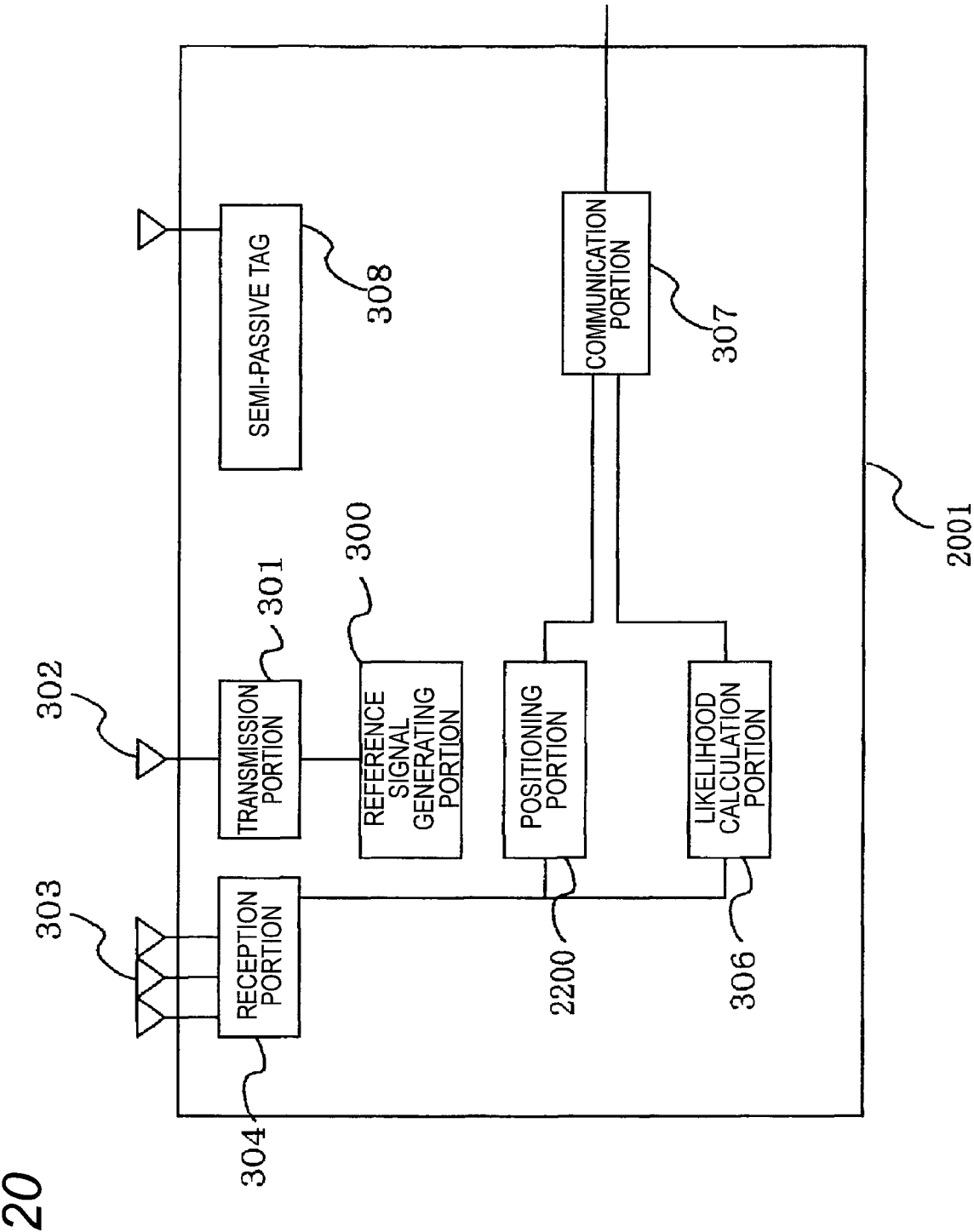
FIG. 20 is a block diagram showing the configuration of a reader 2001 in Embodiment 4 of the invention.

FIG. 20 is a block diagram showing the configuration of the reader 2001 in this embodiment. The reader 2001 shown in FIG. 20 is like each base station in Embodiment 1 and includes a reference signal generating portion 300, a transmission portion 301, a transmission antenna 302, an array antenna 303, a reception portion 304, a positioning portion 2200, a likelihood calculation portion 306, a communication portion 307, and a semi-passive tag 308. The reference signal generating portion 300 generates a reference signal for positioning. The transmission portion 301 converts the reference signal into a radio signal. The array antenna 303 receives a signal from the outside. The reception portion 304 receives a returned signal from a radio terminal tag. The positioning portion 2200 calculates the distance to the radio terminal tag or another reader as a sender of the signal and the direction of arrival of the signal based on the signal received by the reception portion 304. The likelihood calculation portion 306 calculates likelihood of the returned signal from the reader and the radio terminal tag. The communication portion 307 performs data communication with the other reader and the unifying portion. The semi-passive tag 308 returns and transmits the reference signal transmitted from the other reader.

The point of configuration difference of the reader 2001 in this embodiment from the first base station 100 shown in FIG. 3 is the configuration of the positioning portion. The positioning portion 2200 in the configuration of the reader 2100 in this embodiment will be described below.

Figure 21:
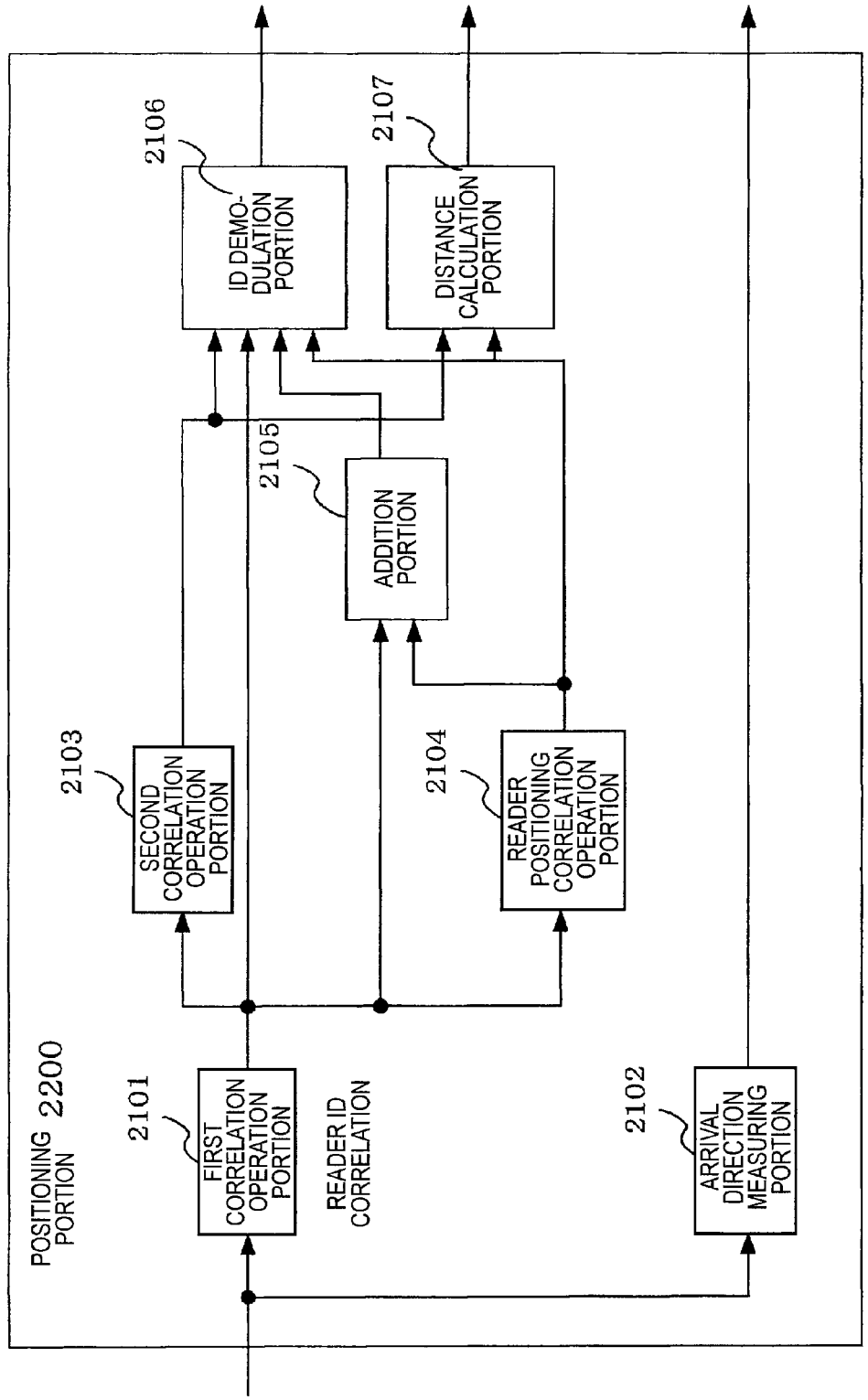
FIG. 21 is a block diagram showing the internal configuration of a positioning portion 2200.

FIG. 21 is a block diagram showing the internal configuration of the positioning portion 2200 of the reader 2001 in this embodiment. The positioning portion 2200 shown in FIG. 21 includes a first correlation operation portion 2101, an arrival direction measuring portion 2102, a second correlation operation portion 2103, a reader positioning correlation operation portion 2104, an addition portion 2105, an ID demodulation portion 2106, and a distance calculation portion 2107.

The first correlation operation portion 2101 performs a correlation operation on a pulse sequence transmitted from the reader 2001 based on the reception signal received from the outside through the array antenna 303 and the reception portion 304 and outputs a correlation result. The correlation operation is for calculating a sliding correlation of the reception signal to the pulse code sequence transmitted from the reader 2001.

The reception signal contains: (1) a signal received in such a manner that the radio terminal tag mounted in the reader 2002 receives a positioning reference signal generated by the reference signal generating portion 300 of the reader 2001, processes the reference signal and transmits the reference signal to the reader 2001; and (2) a signal received in such a manner that the radio terminal tag 2005 receives a positioning reference signal generated by the reference signal generating portion 300, processes the reference signal and transmits the reference signal to the reader 2001.

The arrival direction measuring portion 2102 measures the direction of arrival by using the signal received via the array antenna 303. Although various methods can be thought of as the arrival direction measuring method, beam forming is performed here as an example. Beam forming is a method of controlling the phase and amplitude of the signal received via the array antenna 303 to thereby produce directivity in a specific direction to obtain the direction of arrival of received waves based on signal power in that direction.

The second correlation operation portion 2103 performs a correlation operation on a code sequence M added when the radio terminal tag 2005 returns the positioning reference signal received from the reader 2001, and the result output from the first correction operation portion and outputs a correlation result.

Figure 22A:
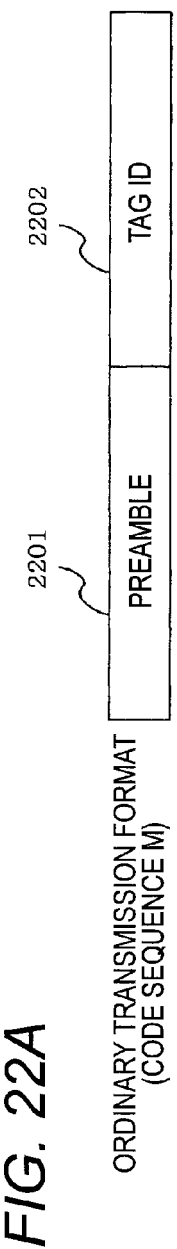
FIG. 22A is a view showing the function of a code sequence M.

The code sequence M will be described here with reference to FIG. 22A. FIG. 22A shows functions of the code sequence added when the ordinary radio terminal tag 2005 not mounted in any reader returns received pulses which are provided as the positioning reference signal received from the reader 2001. The code sequence M is now separated into two functions. A first half of the code sequence M is called preamble 2201. A code sequence common to all radio terminal tags is added as the preamble 2201. A last half of the code sequence M is called radio terminal tag ID 2202. An ID unique to each radio terminal tag 2005 is added as the radio terminal ID tag 2202. The first half preamble is used by the reader 2001 for detecting a signal returned by the radio terminal tag 2005.

The second correlation operation portion 2103 performs a correlation operation on the sequence of the preamble 2201 in the code sequence M shown in FIG. 22A and the output of the first correlation operation portion 2101. The second correlation operation portion outputs a timing signal for performing ID demodulation from the correlation result.

The reader positioning correlation operation portion 2104 detects a preamble sequence 2203 added by the radio terminal tag mounted in the reader 2002 as will be described later in detail (see FIG. 22B). The reader positioning correlation operation portion 2104 receives as an input the correlation operation result output from the first correlation operation portion 2101, performs a correlation operation on the input and a known preamble pattern and outputs a timing signal.

Functions of a code sequence N added when the radio terminal tag mounted in the reader 2002 transmits the positioning reference signal received from the reader 2001 will be described here with reference to FIG. 22B.

Figure 22B:
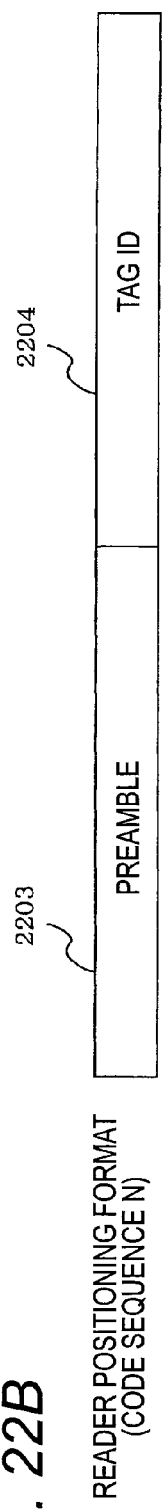
FIG. 22B is a view showing the function of a code sequence N.

FIG. 22B shows a code sequence added to returned pulses in the radio terminal tag mounted in the reader 2002 for positioning the reader 2002. The left of FIG. 22B indicates the head of returned pulses and a time axis is taken rightward. In the code sequence N shown in FIG. 22B, the preamble 2203 is a first half of the code sequence added to the returned pulses in the radio terminal tag mounted in the reader 2002. The preamble 2203 is a known pattern sequence common to all radio terminal tags mounted in readers. The code length of the preamble 2203 in the code sequence N is longer than the code length of the preamble 2201 in the code sequence M (see FIG. 22A).

In the code sequence N shown in FIG. 22B, the tag ID 2204 is a last half of the code sequence added to the returned pulses in the radio terminal tag mounted in the reader 2002. The ID tag 2204 indicates an ID unique to each radio terminal tag. The code length of the tag ID 2204 in the code sequence N is longer than the code length of the tag ID 2202 in the code sequence M (see FIG. 22A).

As described above, the radio terminal tag mounted in the reader 2002 uses the preamble 2203 with a long code length and the tag ID 2204 with a long code length compared with the ordinary radio terminal tag 2005 not mounted in any reader.

The addition portion 2105 receives as inputs the timing signal from the reader positioning correlation operation portion 2104 and the correction result from the first correlation operation portion 2101 and adds a predetermined number of pulses in accordance with the timing signal received from the reader positioning correlation operation portion 2104. The addition portion 2105 outputs a signal having the predetermined number of pulses added. In this manner, the addition portion 2105 can acquire an additional gain by adding the signal transmitted from the radio terminal tag mounted in the reader 2002.

The ID demodulation portion 2106 receives as inputs the correlation operation result output from the first correlation operation portion 2101, the timing signal indicating tag detection output from the second correlation operation portion 2103, the timing signal indicating reader-mounted tag detection output from the reader positioning correlation operation portion 2104 and the addition signal output from the addition portion 2105.

When the timing signal from the second correlation operation portion is input to the ID demodulation portion 2106, the ID demodulation portion 2106 ASK-demodulates the correlation operation result output from the first correlation operation portion in accordance with the timing. Thus, the tag ID is detected from received pulses. Or when the timing signal from the reader positioning correlation operation portion 2104 is input to the ID demodulation portion 2106, the ID demodulation portion 2106 ASK-demodulates the signal output from the addition portion 2105. The ID demodulation portion 2106 outputs an acquired tag ID by ASK-demodulation.

The distance calculation portion 2107 receives as inputs the timing signal output from the second correlation operation portion 2103 and the timing signal output from the reader positioning correlation operation portion 2104. The distance calculation portion 2107 counts time from a timing when the pulse is transmitted. The distance calculation portion 2107 calculates time from a timing when the pulse is transmitted to a timing when a response from the radio terminal tag is received. Therefore, a round-trip time in which the pulse is transmitted from the reader to the radio terminal tag and then returned from the radio terminal tag to the reader can be measured. A distance from the reader to the radio terminal tag is obtained based on the round-trip time. The distance is calculated by such method.

According to the aforementioned configuration, the reader 2001 in this embodiment can acquire an additional gain by performing a process of adding a signal returned from the radio terminal tag mounted in the adjacent reader 2002. Accordingly, the reader 2001 in this embodiment can specify the reader 2002 having the radio terminal tag mounted therein based on the tag ID contained in the transmitted signal.

Moreover, the reader 2001 in this embodiment can acquire the additional gain by adding the signal returned from the radio terminal tag mounted in the adjacent reader 2002 and can measure the distance to the radio terminal tag 2005 or the reader 2002 in the same manner as the ordinary radio terminal tag even when the propagation distance of received pulses is longer than that in an ordinary radio terminal tag (such as the radio terminal tag 2005) which is not mounted in any reader.

Figure 23:
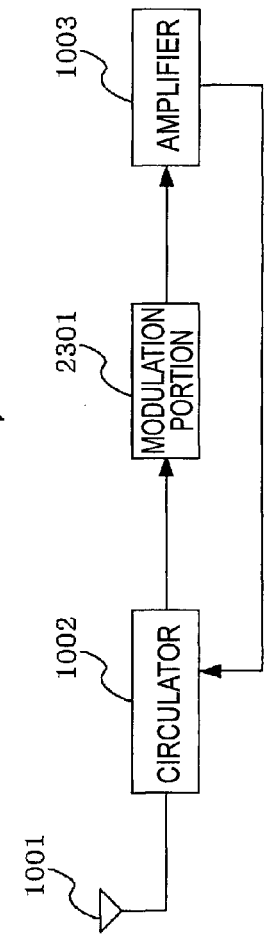
FIG. 23 is a block diagram showing the configuration of a radio terminal tag 2005.

The configuration of the radio terminal tag 2005 in this embodiment will be described next with reference to FIG. 23. FIG. 23 is a block diagram showing the configuration of the radio terminal tag 2005. Incidentally, the same constituent parts as those of the radio terminal shown in FIG. 5 are referred to by the same numerals and description about operation of the constituent parts will be omitted.

The radio terminal tag 2005 shown in FIG. 23 includes an antenna 1001, a circulator 1002, a modulation portion 2301, and an amplifier 1003.

A signal received via the antenna 1001 is input to the modulation portion 2301 through the circulator 1002.

The modulation portion 2301 receives as an input the signal received via the antenna 1001. The modulation portion 2301 adds a tag ID to repeatedly input UWB pulses by ASK modulation. The ASK-modulated pulse signal is input to the amplifier 1003.

Figure 24:
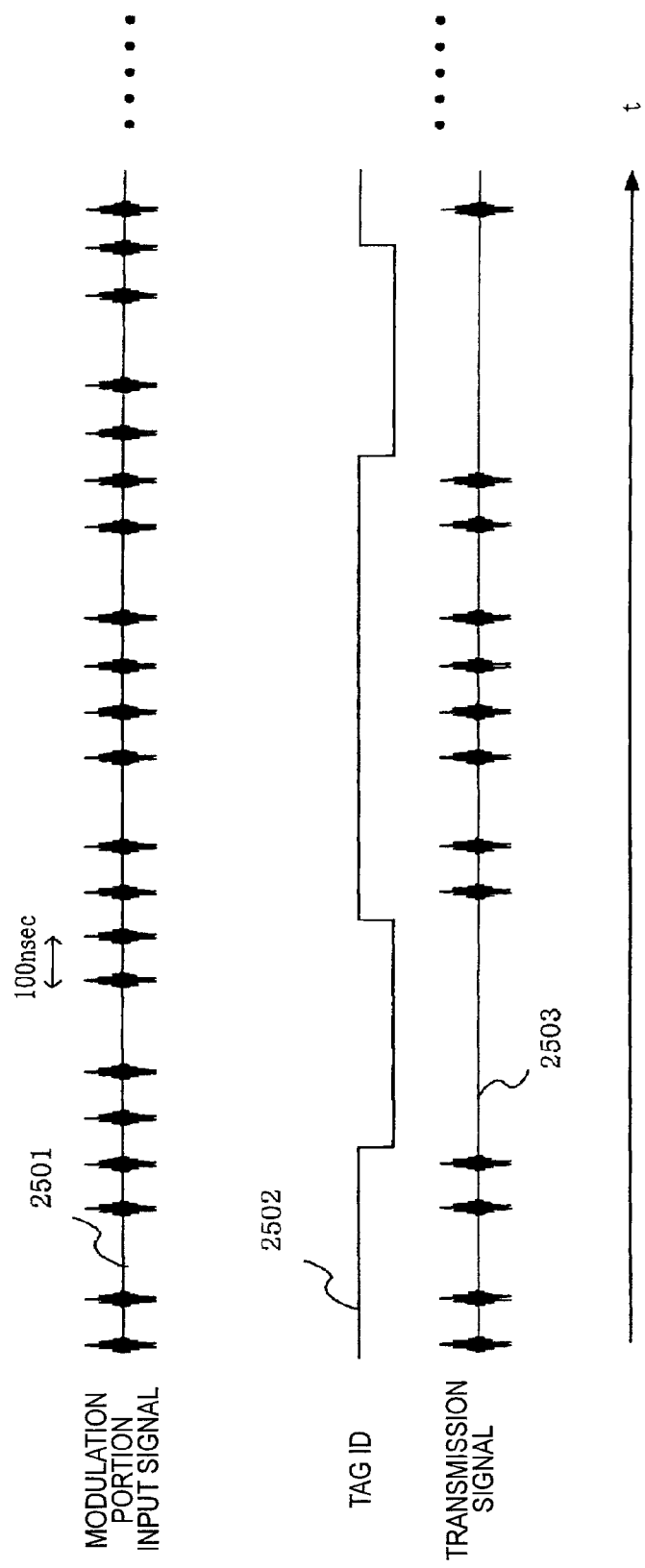
FIG. 24 is a time chart for explaining waves modulated by a modulation portion 2301.

Modulated waves having the tag ID added to an input signal 2501 in the modulation portion 2301 will be described here with reference to FIG. 24. FIG. 24 is a time chart for explaining waves modulated by the modulation portion 2301.

The input signal 2501 is a reception signal input from the circulator 1002. Incidentally, the input signal 2501 is a signal obtained in such a manner that the radio terminal tag 2005 receives a signal transmitted from the reader 2001. The input signal 2501 is a signal obtained in such a manner that pulses generated at intervals of 100 nsec are ASK-modulated with the reader ID of the reader 2001. In the example shown in FIG. 24, the reader ID of the reader 2001 is repeated in accordance with 5 bits. The tag ID 2502 uses the 5-bit sequence length of the reader ID as 1 bit of the tag ID. The tag ID 2502 indicates an ID unique to each tag.

As described with reference to FIG. 24, the modulation portion 2301 generates a transmission signal 2503 by ASK-modulating the reception signal 2501 with the tag ID 2502.

The transmission signal 2503 is formed so that no signal is transmitted when the tag ID is 0. In this manner, the tag ID is added to the reception pulses (input signal 2501) by ASK modulation. The transmission signal 2503 is transmitted from the radio terminal tag 2005.

Figure 25:
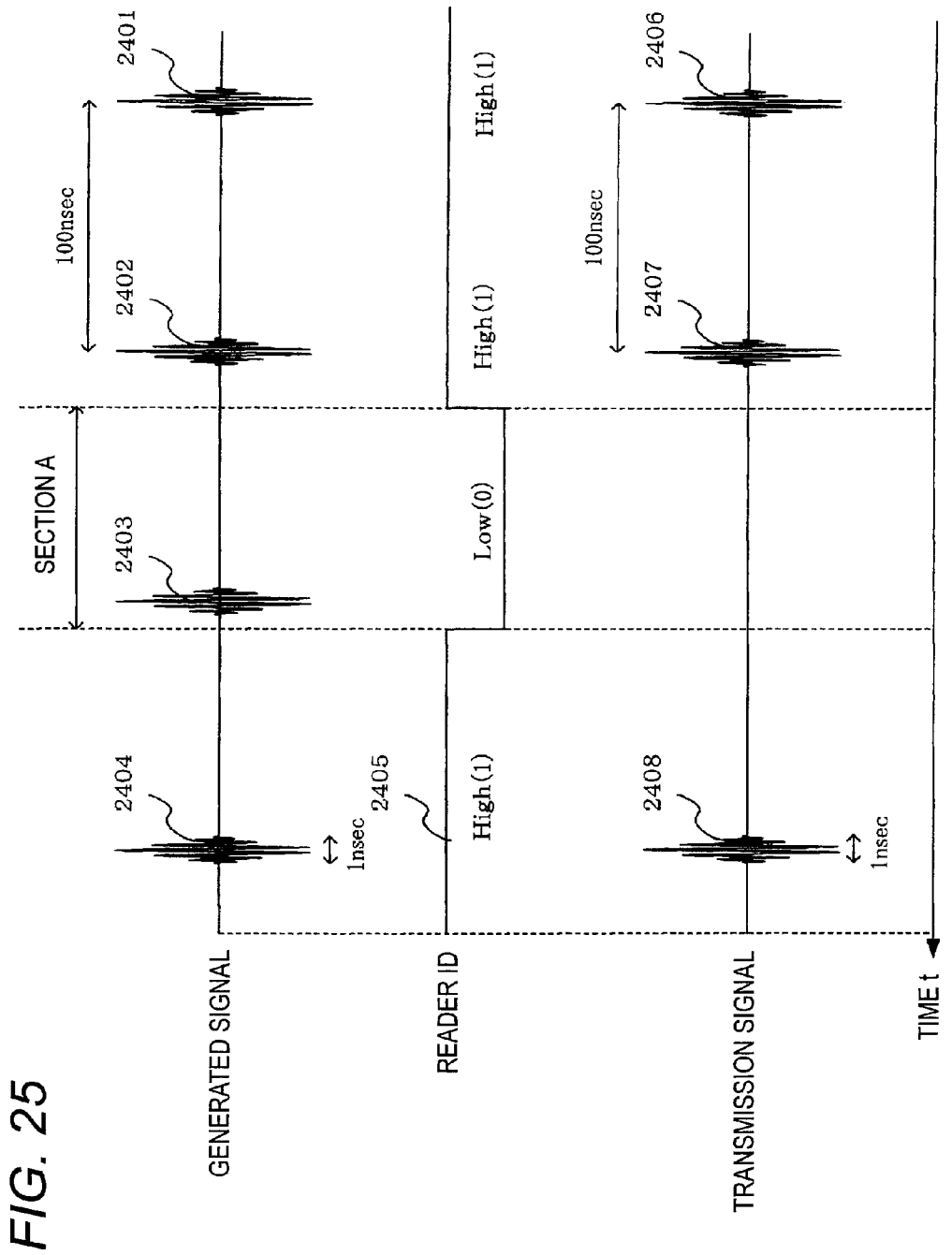
FIG. 25 is a time chart showing a signal transmitted from a reader 2002.
Figure 26:
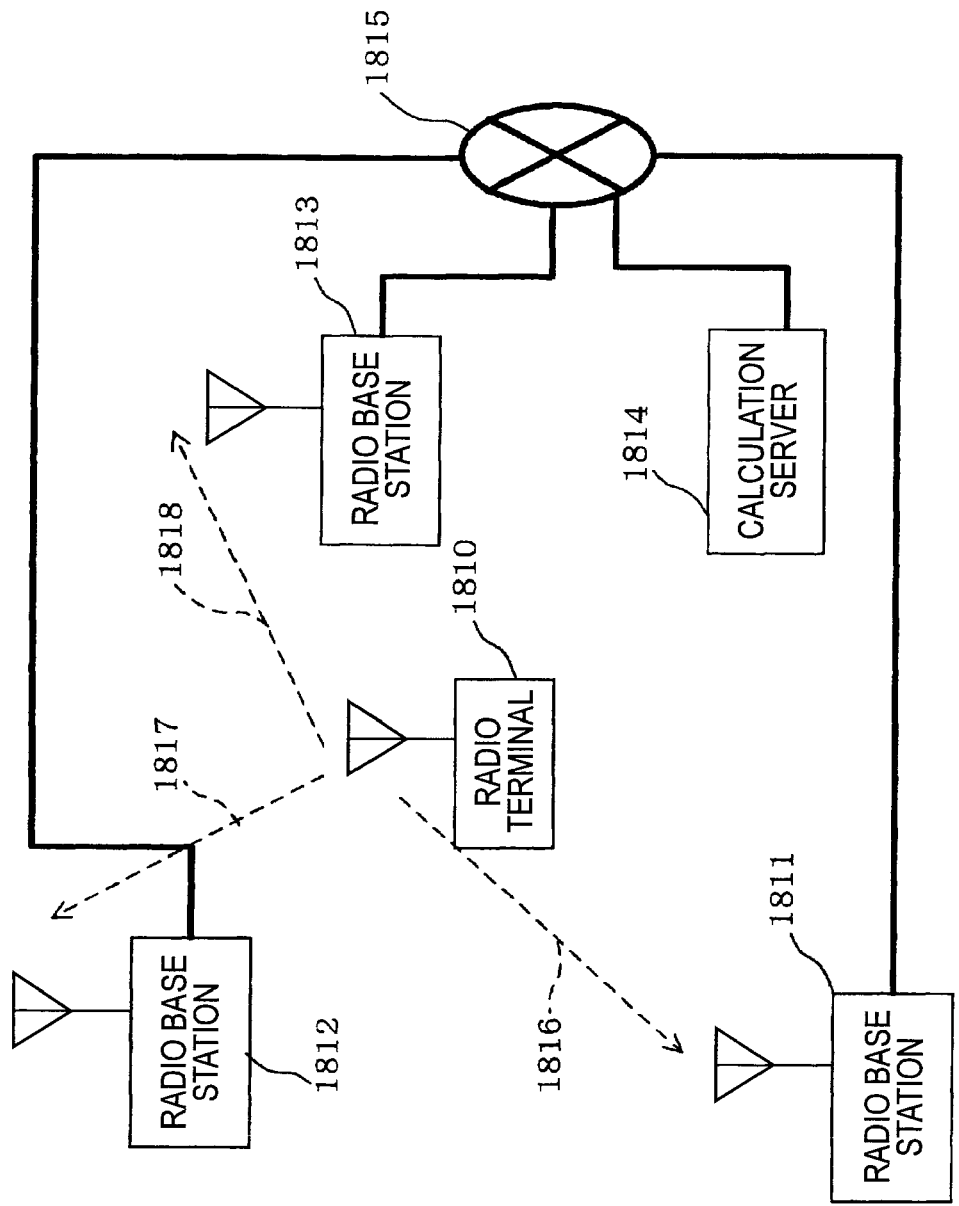
FIG. 26 is a diagram showing a radio positioning system according to the background art.

A signal transmitted from the reader 2002 will be described next with reference to FIG. 25. FIG. 25 is a time chart showing the signal transmitted from the reader 2002. Incidentally, the radio terminal tag mounted in the reader 2002 has the same configuration as that of the radio terminal tag 2005 and detailed description thereof will be omitted.

The reader 2001 repeatedly transmits a UWB pulse signal at regular intervals. The pulse width of each pulse 2408 of the transmitted UWB signal is, for example, 1 nsec. The pulse width of the pulse 2408 provides a resolution for separating a reception signal reflected on and having come from an obstacle or a wall. Therefore, the pulse width can be determined in accordance with an assumed system. Because an indoor environment is now assumed so that a resolution of about 30 cm is required, the pulse width is set to be 1 nsec.

Each of pulses 2401, 2402, 2403 and 2404 forming the generated signal is a 1 nsec-wide UWB pulse. The pulse 2401 is generated by the reader 2001. The pulse 2402 is generated by the reader 2002 after 100 nsec since transmission of the pulse 2401 from the reader 2001. The pulse 2403 is generated after further 100 nsec and the pulse 2404 is generated after further 100 nsec in the same manner as described above. The reader 2001 repeats generation of a UWB pulse forming the generated signal at intervals of 100 nsec in this manner. Incidentally, the reader 2002 generates a signal in the same manner as the reader 2001.

The reader ID 2405 is an ID unique to each reader. The readers 2001 and 2002 have IDs different from each other. The reader ID 2405 is a code sequence composed of 1's and 0's. A pseudo-random sequence is used here as the reader ID 2405. In the reader ID 2405, 1 is expressed as High and 0 is expressed as Low.

The reader 2002 generates a transmission signal by using the reader ID 2405 and the aforementioned pulses 2401 to 2404 forming the generated signal. That is, the reader 2002 ASK-modulates the generated pulses with the reader ID 2405 to thereby generate a transmission signal to be transmitted from the reader 2001.

As shown in FIG. 25, the pulse 2403 existing in a section A where the reader ID is 0 is ASK-modulated so that there is no transmission signal to be transmitted in the section A. Accordingly, pulses 2406, 2407 and 2408 are transmitted as a transmission signal from the reader 2001. Incidentally, the reader 2002 generates and transmits a transmission signal in the same manner. Incidentally, the reader ID shown in FIG. 25 is only an example and the reader ID having a sequence length of 5 bits is used for the sake of simplification of description.

Respective functional blocks used in description of the embodiments can be typically provided as an LSI which is an integrated circuit. Each of these may be formed as one chip individually or part or all of these may be formed as one chip. Although description has been made in the case where the integrated circuit is called LSI, the integrated circuit may be called IC, system LSI, super LSI or ultra LSI in accordance with the difference of integration.

Although the integrated circuit design technique is not limited to the LSI, respective functional blocks may be formed as an exclusive circuit or a general-purpose processor. After production of the LSI, an FPGA (Field Programmable Gate Array) capable of being programmed or a reconfigurable processor capable of reconfiguring connections or settings of circuit cells in the LSI may be used.

If an integrated circuit design technique replaced by the LSI will appear as another technique with the advance or derivation of semiconductor technology, it is a matter of course that integration of functional blocks may be performed by the technique. There is a possibility of application of biotechnology, etc.

Although the invention has been illustrated and described for the particular preferred embodiments, it is apparent to a person skilled in the art that various changes and modifications can be made on the basis of the teachings of the invention.

The present application is based on Japanese Patent Application No. 2008-295510 filed on Nov. 19, 2008, the content of which is incorporated herein for reference.

INDUSTRIAL APPLICABILITY

In the radio positioning system according to the invention, each base station can measure positions relative to other base stations (obtains relative coordinates) to thereby automatically construct a coordinate system indicating position relations between the base stations. The radio positioning system has UWB semi-passive base stations, and a mobile terminal. The invention is useful for a locator or the like of a tag mounted in a remote controller, a label, etc. The invention can be applied to accurate measurement of a distance between objects, etc.

What is claimed is:

1. A radio positioning system comprising:
   a plurality of base stations; and
   a radio terminal,
   wherein each of the base stations includes a reference signal generating portion which generates a reference signal for positioning, a transmission portion which transmits the reference signal, a reception portion which receives a signal from its outside, a positioning portion which calculates a position relative to the radio terminal or base station as a signal sender based on the received signal, and a reference signal return portion which receives a reference signal transmitted from another base station and returns the reference signal to the another base station;
   wherein the radio terminal includes a terminal reception portion which receives the reference signal, and a terminal transmission portion which returns the received reference signal; and
   wherein a reference signal transmitted by a first base station of the base stations is received and returned by the reference signal return portion in a second base station, the returned reference signal is received by the reception portion in the first base station, and the positioning portion in the first base station measures relative coordinates to the second base station based on the received reference signal.

2. The radio positioning system according to claim 1, further comprising:
   a transmission path which connects the base stations to one another; and
   a unifying portion which is connected to the base stations by the transmission path,
   wherein the unifying portion includes a communication portion which receives information through the transmission path, and a unified coordinate transformation portion which generates a unified coordinate system indicating position relations between the base stations based on positioning results measured by the respective base stations and transforms the position of the radio terminal into unified coordinates based on a positioning result of the radio terminal measured by at least one of the base stations.

3. The radio positioning system according to claim 2, wherein each of the base stations repeat a process of measuring a position of a nearby base station and transmitting a result of the measurement to the unifying portion, so that the unifying portion generates a unified coordinate system indicating position relations between all the base stations.

4. The radio positioning system according to claim 2, wherein the unifying portion further includes an averaging portion which averages position information of the radio terminal measured by the respective base stations.

5. The radio positioning system according to claim 2, wherein each of the base stations further includes a likelihood calculation portion which calculates a likelihood based on the signal received in the reception portion; and
   wherein the unifying portion further includes a synthesis portion which weights position information of the radio terminal by using the position and likelihood of the radio terminal measured by each of the base stations and synthesizes the weighted position information.

6. The radio positioning system according to claim 2, wherein each of the base stations further includes a base station identification number acquisition portion which acquires an identification number peculiar to other base station by using a reference signal transmitted by the other base station and received in the reception portion, a base station list storage portion which stores a list of base stations by associating a positioning result indicating a position relative to the other base station with the identification number of the other base station, a list management portion which manages addition/deletion of the positioning result measured by the positioning portion to/from the base station list, a control processor which performs a process of generating a unified coordinate system indicating a position relation between the base stations based on the positioning result measured by the positioning portion and the base station list stored in the base station list storage portion, and a communication portion which communicates information with the other base station.

7. The radio positioning system according to claim 2, wherein each of the base stations repeats a process of measuring the position of a nearby base station and transmitting a result of the position measurement to the unifying portion, so that the unifying portion acquires a unified coordinate system indicating position relations between all the base stations.

8. A coordinate configuring method comprising:
   acquiring ID of an adjacent base station by a reference base station;
   measuring relative coordinates to the adjacent base station by the reference base station;
   storing a result of the position measurement in a base station list held in the reference base station while the result of the position measurement is associated with the ID of the adjacent base station by the reference base station;
   copying a base station list held in the adjacent base station to the reference base station so that the base station list held in the reference base station is updated; and
   broadcasting the updated base station list to other base stations.

9. A coordinate configuring method comprising:
   retrieving whether there is any adjacent base station or not by a reference base station;
   confirming whether position information concerned with the adjacent base station is present in a base station list held in the reference base station or not by the reference base station, when there is the adjacent base station;
   retrieving whether there is any relative station relative to the reference base station in the base station list when the position information concerned with the adjacent base station is present in the base station list held by the reference base station;
   retrieving whether there is any adjacent base station not serving under the reference base station when there is no relative station in the base station list;
   copying the base station list held by the adjacent base station not serving under the reference base station when there is the adjacent base station not serving under the reference base station;
   measuring a position relative to the adjacent base station;
   updating the base station list held by the reference base station by using the positioning result of the adjacent base station and the copied base station list; and
   broadcasting the updated base station list through a network.

10. The coordinate configuring method according to claim 9, further comprising:
    dividing the base station list held by the reference base station when there is no adjacent base station not serving under the reference base station in a process of retrieving whether there is any adjacent base station not serving under the reference base station;

updating position information in the base station list while setting the reference base station as the origin; and broadcasting the updated base station list.

11. The coordinate configuring method according to claim 9, further comprising:

copying the base station list held by the adjacent base station when there is no adjacent base station in the base station list held by the reference base station in a process of confirming whether position information concerned with the adjacent base station is present in the base station list held by the reference base station when there is the adjacent base station;

comparing the ID of an origin base station in the copied base station list of the adjacent base station with the ID of an origin base station in the base station list held by the reference base station;

measuring a position relative to the adjacent base station when the ID of the origin base station in the base station list of the adjacent base station is smaller than the ID of the origin base station in the base station list held by the reference base station;

deleting information on the reference base station from the base station list held by the reference base station;

updating the base station list held by the adjacent base station by adding position information on the reference base station to the base station list copied from the adjacent base station; and broadcasting the updated base station list through the network.

12. The radio positioning system according to claim 1, wherein when the first base station among the base stations transmits the reference signal to the radio terminal and the reference signal is returned by the radio terminal, the positioning portion of the first base station has an addition portion which adds the returned reference signal received through the reception portion.

13. The radio positioning system according to claim 12, wherein when the first base station among the base stations transmits the reference signal to the radio terminal and the reference signal is returned by the radio terminal, the positioning portion of the first base station has an ID demodulation portion which demodulates an ID added by the radio terminal from the received reference signal, and a distance calculation portion which calculates a distance from the first base station to the radio terminal based on the received reference signal.

14. The radio positioning system according to claim 12, wherein the positioning portion has:

a first correlation operation portion which performs a correlation operation of the reference signal transmitted by the first base station and a returned reference signal which is transmitted from the first base station to the radio terminal and returned by the radio terminal;

a second correlation operation portion which performs a correlation operation of an operation result of the first correlation operation part and a code sequence added to the reference signal when the radio terminal receives the reference signal and returns the reference signal; and a base station positioning correlation operation portion which performs a correlation operation of a code sequence added when other radio terminal mounted in the second base station receives the reference signal and returns the reference signal for positioning the second base station.

15. The radio positioning system according to claim 14, wherein the positioning portion has an arrival direction measuring portion which calculates an arrival angle of arrival waves of a signal transmitted by the other radio terminal mounted in the second base station.

16. A coordinate configuring method using a radio positioning system comprising a plurality of base stations and a radio terminal, wherein each of the base stations includes a reference signal generating portion which generates a reference signal for positioning, a transmission portion which transmits the reference signal, a reception portion which receives a signal from its outside, a positioning portion which calculates a position relative to the radio terminal or base station as a signal sender based on the received signal, and a reference signal return portion which receives a reference signal transmitted from another base station and returns the reference signal to the another base station;

wherein the radio terminal includes a terminal reception portion which receives the reference signal, and a terminal transmission portion which returns the received reference signal;

wherein a reference signal transmitted by a first base station of the base stations is received and returned by the reference signal return portion in a second base station, the returned reference signal is received by the reception portion in the first base station, and the positioning portion in the first base station measures relative coordinates to the second base station based on the received reference signal; and wherein when the first base station among the base stations transmits the reference signal to the radio terminal and the reference signal is returned by the radio terminal, the positioning portion of the first base station has an addition portion which adds the returned reference signal received through the reception portion, the coordinate configuring method comprising:

detecting whether a code sequence extracted from a pulse returned from a radio terminal mounted in the second base station is the signal returned from the other radio terminal mounted in the second base station or a signal returned from a radio terminal other than the radio terminal mounted in the second base station by the first base station;

adding a large number of pulses compared with the signal returned from the other radio terminal mounted in the second base station to a signal in a case that relative positions of the first base station and the second base station are not changed when it is detected that the code sequence extracted from the pulse returned from the other radio terminal mounted in the second base station is the signal returned from the other radio terminal mounted in the second base station;

measuring the position of the second base station and configuring an accurate coordinate system based on a result of the measured position of the base station.

* * * * *